US009525470B1

(12) United States Patent
Wu et al.

(10) Patent No.: US 9,525,470 B1
(45) Date of Patent: Dec. 20, 2016

(54) ADAPTIVE MULTIPLE-INPUT MULTIPLE-OUTPUT (MIMO) DATA DETECTION AND PRECODING

(71) Applicant: Xilinx, Inc., San Jose, CA (US)

(72) Inventors: Michael Wu, Palo Alto, CA (US); Christopher H. Dick, San Jose, CA (US); Christoph E. Studer, Ithaca, NY (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/887,186

(22) Filed: Oct. 19, 2015

(51) Int. Cl.
*H04B 7/04* (2006.01)
*H04L 5/00* (2006.01)

(52) U.S. Cl.
CPC .......... *H04B 7/0456* (2013.01); *H04B 7/0482* (2013.01); *H04L 5/0023* (2013.01); *H04B 7/0452* (2013.01)

(58) Field of Classification Search
CPC ... H04B 7/0456; H04B 7/0482; H04B 7/0413; H04B 7/0452; H04L 5/0023; H04L 5/0005; H04L 27/2601; H04L 27/2626; H04L 27/2647
USPC .................................................. 375/260, 267
See application file for complete search history.

(56) References Cited

U.S. PATENT DOCUMENTS

| 7,561,632 B1 * | 7/2009 | van Zelst | H04B 7/0619 |
| | | | 375/267 |
| 7,590,182 B2 * | 9/2009 | Ling | H04B 7/0417 |
| | | | 375/219 |
| 9,001,924 B1 | 4/2015 | Wu et al. | |
| 2006/0285531 A1 * | 12/2006 | Howard | H04B 7/0413 |
| | | | 370/343 |
| 2008/0317172 A1 * | 12/2008 | Zhang | H04B 7/0413 |
| | | | 375/340 |

OTHER PUBLICATIONS

L. Dai, X. Gao, X. Su, S. Han, C. I; Z. Wang, "Low-Complexity Soft-Output Signal Detection Based on Gauss-Seidel Method for Uplink Multi-User Large-Scale MIMO Systems," IEEE Transactions on Vehicular Technology, pp. 1-7, Nov. 2014.

F. Rusek, D. Persson, B. K. Lau, E. G. Larsson, T. L. Marzetta, O. Edfors, and F. Tufvesson, "Scaling up MIMO: Opportunities and Challenges with Very Large Arrays," IEEE Signal Process. Mag., vol. 30, No. 1, pp. 40-60, Jan. 2013.

(Continued)

*Primary Examiner* — Betsy Deppe
(74) *Attorney, Agent, or Firm* — David O'Brien

(57) ABSTRACT

A system includes a memory and an integrated circuit coupled to the memory. The integrated circuit is configured to communicate data in a channel characterized as a space having at least a frequency dimension. Anchor locations within the space correspond to respective regions of the space. The integrated circuit is further configured to determine a first inverse of a first matrix that corresponds to a first channel matrix for a first anchor location of the anchor locations. The first anchor location corresponds to a first region of the regions. The integrated circuit is further configured to perform an access link process for a second location other than the first anchor location but within the first region, the access link process using the first inverse determined for the first anchor location.

20 Claims, 12 Drawing Sheets

(56) References Cited

OTHER PUBLICATIONS

M. Wu, B. Yin, G. Wang, C. Dick, J. R. Cavallaro, and C. Studer, "Large-scale MIMO detection for 3GPP LTE: Algorithm and FPGA implementations," IEEE Journal of Selected Topics in Signal Processing, pp. 1-14, Mar. 2014.

B. Yin, M. Wu, J.R. Cavallaro, and C. Studer, "Conjugate gradient-based soft-output detection and precoding in massive MIMO systems," IEEE Global Communications Conference (GLOBECOM), 2014, pp. 1-7, Dec. 2014.

\* cited by examiner

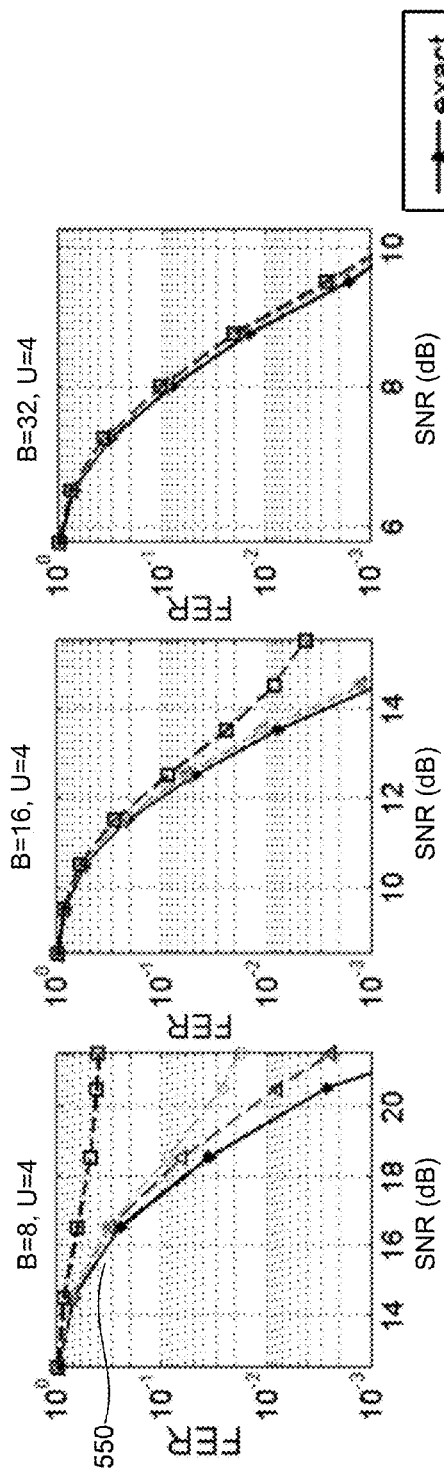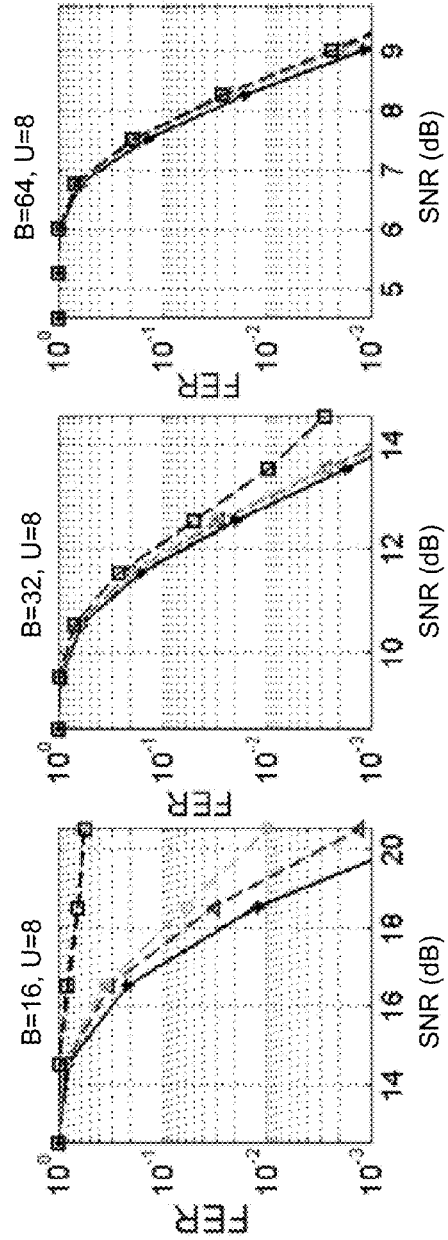

ADAPTIVE MULTIPLE-INPUT MULTIPLE-OUTPUT (MIMO) DATA DETECTION AND PRECODING

FIELD

Examples of the present disclosure generally relate to integrated circuits ("ICs") and, in particular, to an embodiment related to adaptive data detection and adaptive precoding in a multiple-input, multiple-output ("MIMO") system.

BACKGROUND

MIMO operation in combination with spatial multiplexing is used in various wireless standards, such as IEEE 802.11n, IEEE 802.11ac, Evolved High-Speed Packet Access (HSPA+), Worldwide Interoperability for Microwave Access (WiMAX), and Long Term Evolution (LTE) for example. In MIMO systems, multiple spatially separated users may be concurrently serviced, and multiple data streams may be concurrently transmitted in the same frequency band. However, conventional MIMO systems have ever-increasing demands on throughput, and limits on throughput of such MIMO systems are quickly approaching due to such increasing demand. Furthermore, there is more competition for frequency bands for wireless communication.

Accordingly, it would be desirable and useful to provide a transmission and/or a reception technology that facilitates meeting a growing demand for higher throughput without a further increase in the communication bandwidth.

SUMMARY

A large-scale MIMO system may use a large number of antennas at the base station, which may significantly increase computational complexity. With the large number of antennas at the base station, the channel matrix becomes very large. Matrix inversion of such a large channel matrix for each subcarrier typically used in processes in both the uplink (e.g., the uplink detection process) and the downlink (e.g., the downlink precoding process) can be computationally challenging. For integrated circuit (IC) solutions, it has been discovered that the time and/or frequency correlation of the communication channel may be exploited to reduce computational complexity of matrix inversion, which may improve IC performance in computation bandwidth or speed, power consumption, manufacturing cost, and/or form factor. In some embodiments, the communication channel may be characterized as a space having at least time and frequency dimensions, and a matrix inverse for a particular location within the space may be estimated by using a matrix inverse for an anchor location within the space. Therefore, in some embodiments of the present disclosure, it is possible to perform explicit matrix inversions only for a set of anchor locations within the space, and use these matrix inverses for the set of anchor locations to facilitate computation for other locations in the space.

In some embodiments in accordance with the present disclosure, a method includes communicating data in a channel characterized as a space having at least a frequency dimension, wherein anchor locations within the space correspond to respective regions of the space. A first inverse of a first matrix that corresponds to a first channel matrix for a first anchor location of the anchor locations is determined, where the first anchor location corresponds to a first region of the regions. An access link process for a second location other than the first anchor location but within the first region is performed, and the access link process uses the first inverse determined for the first anchor location.

In some embodiments, the method further includes estimating a second inverse of a second matrix that corresponds to a second channel matrix for the second location using the first inverse.

In some embodiments, the access link process for the second location is performed without performing an explicit multiplication of a Hermitian-transposed second channel matrix and the second channel matrix.

In some embodiments, the method further includes receiving a receive vector for the second location; computing a matched filter output for the second location; and computing a data output for the second location using the matched filter output. The first anchor location corresponds to a $w^{th}$ frequency unit in the frequency dimension, and the second location corresponds to a $j^{th}$ frequency unit in the frequency dimension. The data output is expressible as:

$$\hat{y}_j = 2A_w^{-1} y_j^{MF} - A_w^{-1}(H_j^H H_j A_w^{-1} y_j^{MF} + \sigma^2 A_w^{-1} y_j^{MF}),$$

where $H_j$ represents the second channel matrix, $H_j^H$ represents the Hermitian-transposed second channel matrix, $A_w^{-1}$ represents the first inverse for the first anchor location, $\sigma^2$ represents a noise variance, $y_j^{MF}$ represents the matched filter output, and $\hat{y}_j$ represents the data output.

In some embodiments, the space further has a time dimension. In some embodiments, the first region corresponds to only one time unit in the time dimension. In some embodiments, the first region corresponds to only one frequency unit in the frequency dimension. In some embodiments, the first region corresponds to multiple time units in the time dimension and multiple frequency units in the frequency dimension.

In some embodiments, the access link process is one of a downlink precoding process and an uplink data detection process.

In some embodiments, the method further includes performing an exact inversion of the first matrix or an approximate matrix inversion of the first matrix using a series expansion.

In some embodiments in accordance with the present disclosure, a system includes a memory; and an integrated circuit coupled to the memory. The integrated circuit is configured to communicate data in a channel characterized as a space having at least a frequency dimension, wherein anchor locations within the space correspond to respective regions of the space; determine a first inverse of a first matrix that corresponds to a first channel matrix for a first anchor location of the anchor locations, wherein the first anchor location corresponds to a first region of the regions; and perform an access link process for a second location other than the first anchor location but within the first region, the access link process using the first inverse determined for the first anchor location.

In some embodiments, the integrated circuit is further configured to estimate a second inverse of a second matrix that corresponds to a second channel matrix for the second location using the first inverse.

In some embodiments, the integrated circuit is configured to perform the access link process for the second location without performing an explicit multiplication of a Hermitian-transposed second channel matrix and the second channel matrix.

In some embodiments, the integrated circuit is further configured to receive a receive vector for the second location; compute a matched filter output for the second location; and compute a data output for the second location using the matched filter output. The first anchor location corresponds to a $w^{th}$ frequency unit in the frequency dimension, and the second location corresponds to a $j^{th}$ frequency unit in the frequency dimension. The data output is expressible as:

$$\hat{y}_j = 2A_w^{-1} y_j^{MF} - A_w^{-1}(H_j^H H_j A_w^{-1} y_j^{MF} + \sigma^2 A_w^{-1} y_j^{MF}),$$

where $H_j$ represents the second channel matrix, $H_j^H$ represents the Hermitian-transposed second channel matrix, $A_w^{-1}$ represents the first inverse for the first anchor location, $\sigma^2$ represents a noise variance, $y_j^{MF}$ represents the matched filter output, and $\hat{y}_j$ represents the data output.

In some embodiments, the first anchor location has a predefined initial value. In some embodiments, the first anchor location is updated according to channel conditions of the channel.

In some embodiments, the integrated circuit includes a field programmable gate array (FPGA), and the FPGA is configured by a configuration bitstream from the memory.

Other aspects and features will be evident from reading the following detailed description and accompanying drawings.

BRIEF DESCRIPTION OF THE DRAWINGS

FIGS. 6A-6F illustrate performance comparison between various embodiments according to the present disclosure.

DETAILED DESCRIPTION

Figure 1:
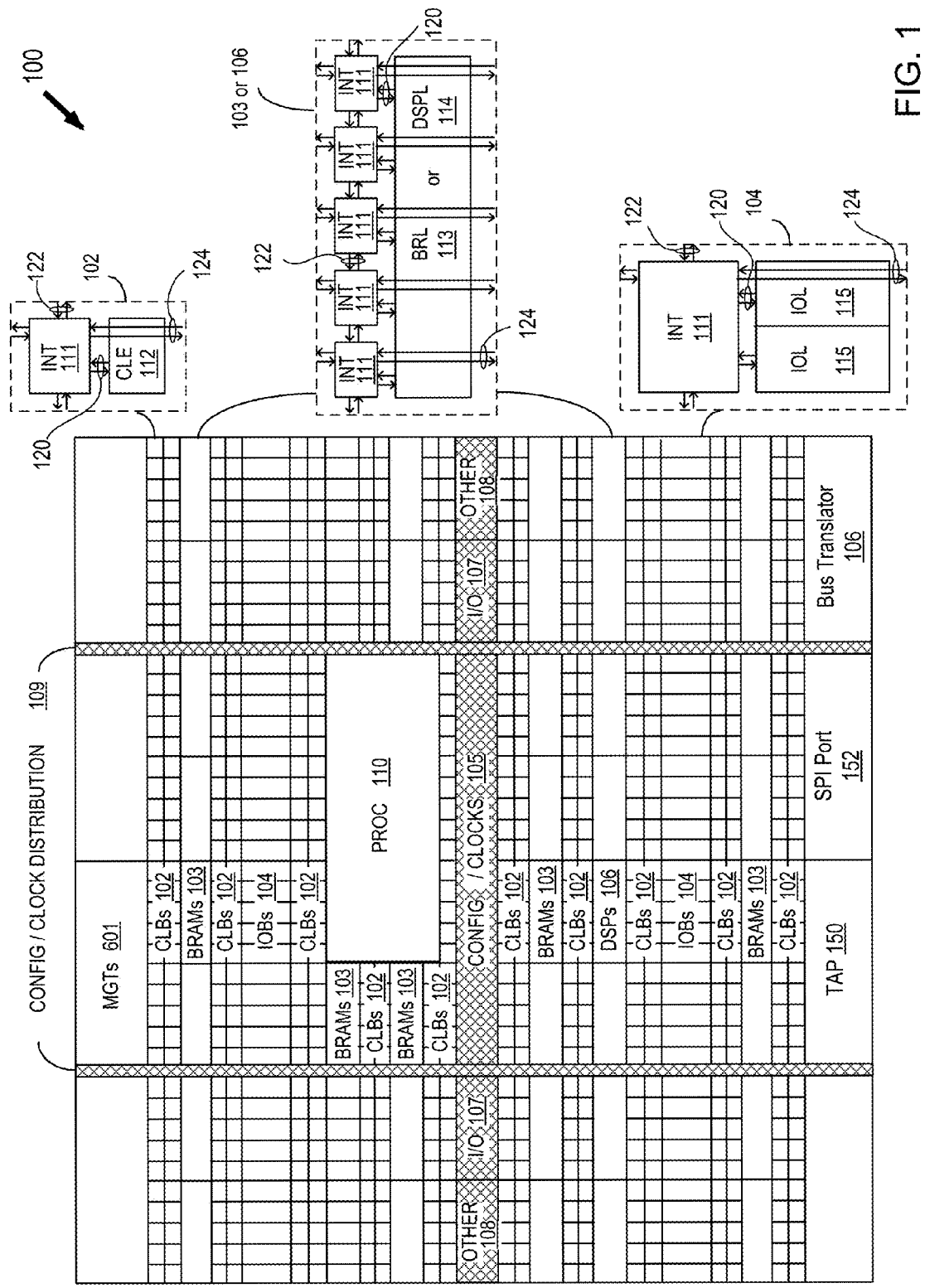
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. Large-scale or massive multi-user (MU) MIMO systems use a large number of antenna units having orders of magnitude more elements at the base station compared to small-scale MIMO systems, while serving multiple users simultaneously and in the same frequency band. However, having a large number of antenna units at the base station may significantly increase complexity of computations performed in large-scale MIMO. For example, uplink data detection at a base station may involve channel matrix inversion for each subcarrier for a linear detection scheme. For further example, downlink precoding at a base station may involve channel matrix inversion for each subcarrier for a linear precoding scheme. Along these lines, with so many more antenna units at the base station, the channel matrix becomes very large, and inversion of such a large channel matrix for each subcarrier may add a significant computational burden for uplink data detection and downlink precoding.

With the above general understanding borne in mind, various embodiments for adaptive MIMO data detection and adaptive MIMO precoding involving channel matrix inversion are generally described below. While some embodiments may be more useful in large-scale MIMO systems due to the large number of antenna units at the base station, small-scale MIMO systems or other wireless communication systems may also benefit from the present disclosure as described herein. Furthermore, even though the description below is directed at particular examples of adaptive data detection and adaptive precoding, other applications where a matrix inverse may be required may benefit from the present disclosure as described herein.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 601, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

It is noted that the IC that may implement the adaptive MIMO data detection and adaptive precoding is not limited to the exemplary IC depicted in FIG. 1, and that IC having other configurations, or other types of IC, may also implement the adaptive MIMO data detection and adaptive precoding.

Figure 2A:
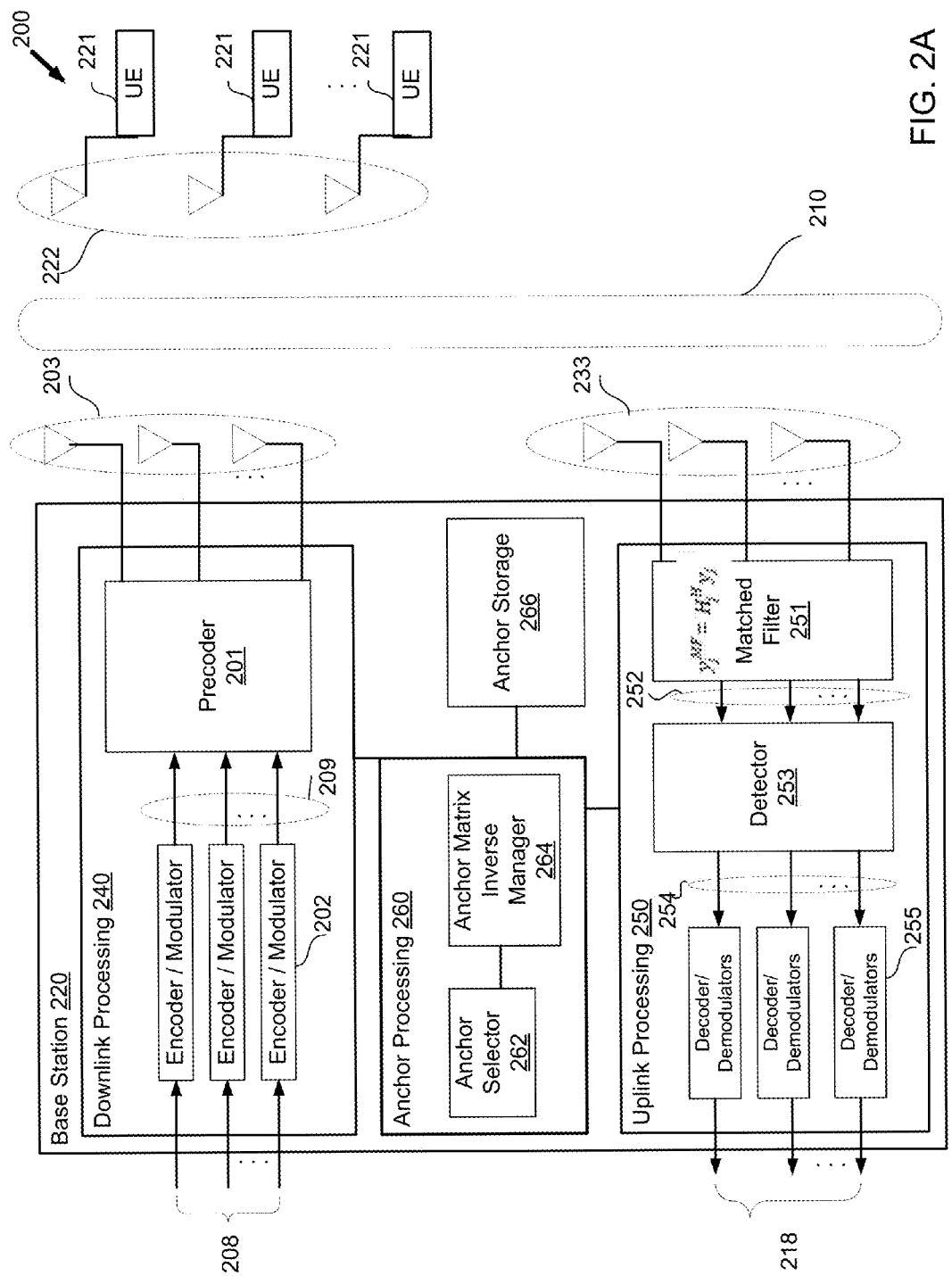
FIG. 2A is a block diagram illustrating an exemplary communication system according to some embodiments of the present disclosure.

FIG. 2A is a block diagram depicting an exemplary communication system 200. Communication system 200 includes a base station 220 and users 221 (also referred to as user devices or user equipment (UE) units). More than one user 221 may be coupled to base station 220 at a time. Users 221 may be coupled to base station 220 via over-the-air ("wireless") communication channel 210.

Communication system 200 is for bidirectional communication, namely a downlink for sending information from base station 220 to users 221, and an uplink for sending information from users 221 to base station 220. Both the downlink and uplink may be referred to as access links. Base station 220 may include a downlink processing section 240 and an uplink processing section 250, which may also be referred to as access link processing sections 240 and 250. Base station 220 may also include an anchor processing section 260 and an anchor storage 266, which may help facilitate and reduce complexity for computation performed by downlink processing section 240 and uplink processing section 250.

In some embodiments, communication system 200 may be a MIMO system with B base station antennas (e.g., B transmit antennas 203 for a downlink, or B receive antennas 233 for an uplink) at base station 220 communicating with U user antennas 222 of users 221 in an access link (e.g., a downlink or an uplink), where B and U are positive integers greater than 1. It is noted that transmit antennas 203 and receive antennas 233 may have the same number of antenna units or different numbers of antenna units. Each user 221 may have a single antenna or multiple antennas 222 coupled to base station 220. An example of base station 220 concurrently serving U single antenna users may be applied straightforwardly to base station 220 concurrently serving users 221 with multiple antennas. Thus, even though U as described below may generally refer to U user antennas from U single antenna users, U may be considered to include a number of antennas of single and/or multiple antenna users being serviced by a base station 220.

In some embodiments, in the uplink, the FD symbols transmitted by the i-th user 221 may be modeled as:

$$s^{(i)} = [s_1^{(i)}, \ldots, s_L^{(i)}]^T,$$

where L corresponds to the number of symbols transmitted by the i-th user. In some embodiments, for each user 221, the FD symbols are assigned onto data-carrying subcarriers and transformed to the time domain. All U users 221 then transmit their time-domain signals simultaneously over the wireless communication channel 210.

In some embodiments, at the base station 220, each receive antenna 233 may obtain a mixture of time-domain signals from all U users 221. For uplink data detection, the time-domain signals received at each receive antenna 233 are first transformed back into the frequency domain (e.g., using an inverse discrete Fourier transform (DFT)), followed by extraction of the data-carrying symbols on subcarriers. The received FD symbols $y_w$ (also referred to as receive vector) on subcarrier w received by base station 220 can be modeled as $y_w = H_w^u s_w + n_w$, with the following definitions.

$$y_w = [y_w^{(1)}, \ldots, y_w^{(B)}]^T, s_w = [s_w^{(1)}, \ldots, s_w^{(U)}]^T, n_w = [n_w^{(1)}, \ldots, n_w^{(B)}]^T, \text{ and}$$

$$H_w^u = \begin{bmatrix} h_w^{(1,1)} & \cdots & h_w^{(1,U)} \\ \vdots & \ddots & \vdots \\ h_w^{(B,1)} & \cdots & h_w^{(B,U)} \end{bmatrix}.$$

Here, $y_w^{(i)}$ is the FD symbol received on subcarrier w for the i-th receive antenna 233. $H_w^u$ is a channel matrix where $h_w^{(i,j)}$ is the frequency gain/attenuation on subcarrier w between the i-th receive antenna 233 and j-th user 221. In the following description, the superscript u to indicate an uplink side in some instances may be omitted for the sake of simplicity of exposition. The scalar $s_w^{(j)}$ denotes the symbol transmitted by the j-th user 221 on subcarrier w, and the scalar $n_w^{(i)}$ represents noise at the i-th receive antenna 233 in the frequency domain (e.g., complex i.i.d. zero-mean Gaussian noise with variance $N_0$).

In some embodiments, as shown in the example of FIG. 2A, the receive vector $y_w$ and channel matrix $H_w$ may be provided to uplink processing section 250 of base station 220. Uplink processing section 250 may then perform data detection using channel matrix $H_w$ and receive vector $y_w$, which will be discussed below in additional detail below with reference to uplink process station 250.

The data detection may be performed on a per-subcarrier basis to provide an equalized FD symbol for each subcarrier. Equalized FD symbols may be used to compute log-likelihood ratio (LLR) values or soft-outputs.

Even though the description above is directed at an uplink side of a communication channel, a downlink side of a communication channel may be similarly modeled. For example, in the downlink, a basestation 220 with B transmit antennas 203 may transmit a data vector (also referred to as a transmit vector) to the U single-antenna users 221. In some embodiments, to avoid or reduce multi-user interference ("MUI"), downlink processing section 240 may implement precoding to the data vector to be transmitted, which will be discussed in additional detail with reference to downlink processing section 240 and its precoder 201. A downlink channel matrix $H_w^d$ may be used to perform precoding. Like the channel matrix $H_w^u$ in the uplink, the channel matrix $H_w^d$ in the downlink on subcarrier w may be represented as follows:

$$H_w^d = \begin{bmatrix} h_w^{(1,1)} & \cdots & h_w^{(1,B)} \\ \vdots & \ddots & \vdots \\ h_w^{(U,1)} & \cdots & h_w^{(U,B)} \end{bmatrix},$$

where $h_w^{(i,j)}$ is the frequency gain/attenuation on subcarrier w between the i-th user 221 and the j-th transmit antenna 203. In many applications, channel reciprocity between an uplink channel and a downlink channel may be assumed, namely:

$$H_w^u = (H_w^d)^H.$$

In the following description, the superscripts d and u to indicate a downlink side and an uplink side in some instances may be omitted for the sake of simplicity of exposition.

The precoding may be performed on a per-subcarrier basis and result in a precoded vector for each subcarrier. A precoded vector for a particular subcarrier may be transmitted by the transmit antennas 203 over the communication channel 210 to users 221.

Base station 220 may employ an anchor processing section 260 to facilitate computation required for both uplink data detection and downlink precoding. The uplink data detection process and downlink precoding process may also be referred to as access link processes. Both uplink data detection and downlink precoding may be performed on a per-subcarrier basis, and may involve two similar computation requirements for each of the subcarriers. First, computation for a Gram Matrix for each of the subcarriers may be performed. Second, subsequent matrix inversion (exact or approximation) of a regularized Gram Matrix A to determine a matrix inverse $A^{-1}$ for each of the subcarriers may be required. These computation requirements may be a significant portion of computation for linear data detection and/or linear precoding, including without limitation ZF or MMSE data detection and/or precoding. Anchor processing section 260 may be used by one or both of downlink processing section 240 (e.g., precoder 201) and uplink processing section 250 (e.g., detector 253) to reduce computational complexity in processes involving computation for a Gram Matrix or subsequent matrix inversion of a regularized Gram Matrix.

As shown in the example of FIG. 2A, anchor processing section 260 of base station 220 may include anchor selector 262 and anchor computation manager 264. The anchor processing section 260 (e.g., anchor computation manager 264) may receive an anchor request from downlink processing section 240 or uplink processing section 250. The communication channel may be characterized as a space having time and/or frequency dimensions. Each location in the space may correspond to a subcarrier in the frequency dimension and/or a symbol in the time dimension. The anchor request may include a location identifier (e.g., a subcarrier identifier associated with a particular subcarrier and/or a symbol identifier associated with a particular symbol) for identifying a particular location in the space. Anchor processing section 260 may determine an anchor location for the particular location. Various configurations of anchor locations will be discussed in additional detail with reference to FIGS. 5A-5C. The anchor processing section 260 may determine and store anchor computation results (e.g., anchor matrix inverse) associated with the anchor location, and provide anchor computation results to downlink processing section 240 or uplink processing section 250.

In some embodiments, anchor selector 262 may receive the anchor request from anchor computation manager 264, and use anchor storage 266 to determine the anchor location for the particular location identified by the anchor request. In one example, anchor selector 262 may look up and retrieve from anchor storage 266 an anchor location using the location identifier provided by the anchor request. In some embodiments, anchor selector 262 may determine the anchor location and store the anchor location for the particular location in the anchor storage 266. The anchor location determined by anchor selector 262 may be provided to anchor computation manager 264.

In some embodiments, anchor computation manager 264 may receive the anchor location (e.g., anchor location including subcarrier w) from anchor selector 262, and retrieve, compute, and/or store anchor computation results (e.g., an anchor matrix inverse $A_w^{-1}$ of regularized Gram Matrix $A_w$ for the anchor location) for the received anchor location. In one example, anchor computation manager 264 may retrieve anchor computation results (e.g., an anchor matrix inverse $A_w^{-1}$ for the anchor location from anchor storage 266. If the anchor computation results are not available from anchor storage 266, anchor computation manager 264 may compute or otherwise determine the anchor computation results and store them in anchor storage 266.

In some embodiments, the anchor computation manager 264 may provide the anchor computation results to one or both of downlink processing section 240 and uplink processing section 250. In some embodiments, downlink processing section 240 and uplink processing section 250 may use the received anchor matrix inverse to perform access link processes for the particular location that may be different from the anchor location.

Anchor processing section 260 may be implemented in hardware, software, or a combination of hardware and software. In some embodiments, anchor processing section 260 may be implemented using various hardware resources, for example, DSP slices, BRAM, and programmable resources of an FPGA. In some embodiments, digital signal processing (DSP) processors, microprocessors, multi-core processors, memory, general purpose processors (GPP) and/or other hardware may be used. Anchor processing section 260 may carry out computations by using a processor, which may be embedded in an FPGA, instantiated in FGPA fabric, or externally coupled to an FPGA.

Anchor storage 266 may be implemented using BRAM, distributed memory, FPGA off chip memory and/or other suitable memories.

In some embodiments, the downlink processing section 240 may use anchor processing section 260 to facilitate computation required for adaptive precoding and reduce computational complexity. As shown in FIG. 2A, downlink processing section 240 may include a plurality of encoding and modulation blocks 202, namely encoders and modulators. The encoding and modulation blocks 202 may be coupled to receive data for transmission 208, and encode and modulate the received data to provide encoded and modulated information streams 209. The encoded and modulated information streams 209 (also referred to as information streams vector) are sent to a precoder 201 for precoding. The precoding may be performed on a per-subcarrier basis. During a precoding process, for a particular subcarrier, the precoder 201 may send an anchor request to anchor processing section 260, and receive anchor computation results for the particular subcarrier. The precoder 201 may use the anchor computation results for precoding associated with the particular subcarrier.

Figure 2B:
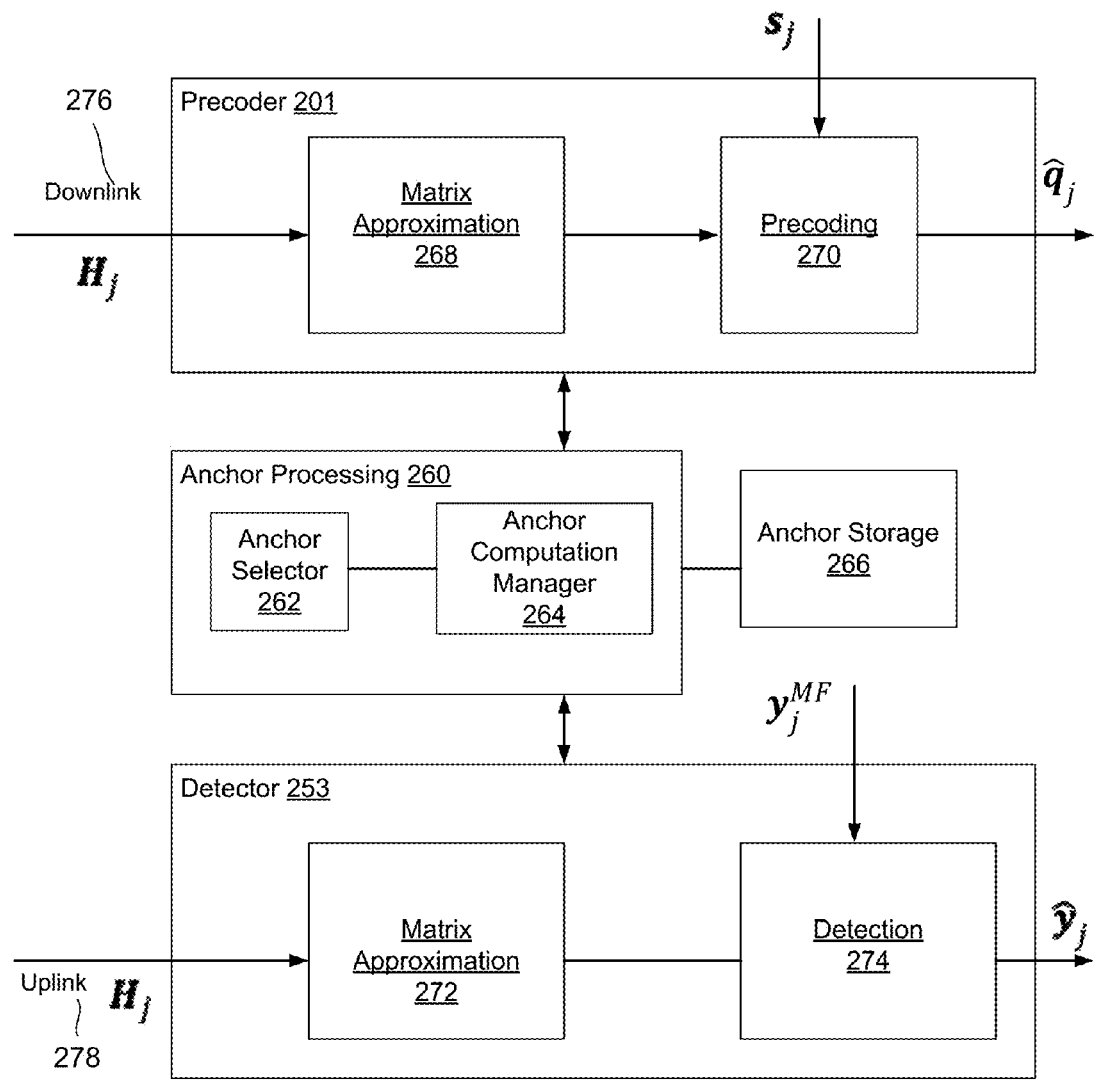
FIG. 2B is a block diagram illustrating the exemplary precoder, anchor processing section, and detector of FIG. 2A according to some embodiments of the present disclosure.

Referring now to FIG. 2B, precoder 201 may include a matrix approximation block 268 and a precoding block 270. In some embodiments, for a particular subcarrier j, matrix approximation block 268 may be coupled to receive downlink channel matrix $H_j^d$ 276 to compute or otherwise determine a Gram Matrix, $G_j$, where $$G_j = H_j^d (H_j^d)^H$$

where $(H_j^d)^H$ is a Hermitian-transposed downlink channel matrix.

In some embodiments, matrix approximation block 268 may be used to provide a regularized Gram Matrix $A_j$. The matrix approximation block 268 may be configured to compute or otherwise determine regularized Gram Matrix $A_j$, where $$A_j = G_j + \sigma^2 I, \text{ or } A_j = H_j H_j^H + \sigma^2 I,$$

Where $\sigma^2$ represents a noise variance, $\sigma^2=0$ for ZF detection, and $\sigma^2 = N_0 E_s^{-1}$ for MMSE, where $N_0$ represents noise variance, and $E_s$ represents an average energy for a symbol s.

In some embodiments, matrix approximation block 268 may be used to provide a matrix inverse of regularized Gram Matrix $A_j$, denoted by $\hat{A}_j^{-1}$ or $A_j^{-1}$. In some embodiments, matrix approximation block 268 may perform an explicit computation of Gram Matrix $G_j$ (e.g., by multiplying $H_j$ and $H_j^H$), and thereafter determine regularized Gram Matrix $A_j$ using the computed Gram Matrix $G_j$. In one example, matrix approximation block 268 may perform an exact matrix inversion of regularized Gram Matrix $A_j$ to determine $A_j^{-1}$. Alternatively, in another example, matrix approximation block 268 may perform an approximate matrix inversion (e.g., based on a Neumann series expansion) of regularized Gram Matrix $A_j$ to determine $\hat{A}_j^{-1}$.

In some embodiments, matrix approximation block 268 may use anchor processing section 260 to determine $\hat{A}_j^{-1}$. For example, matrix approximation block 268 may perform an approximate matrix inversion to determine $\hat{A}_j^{-1}$ using an update function as follows:

$$\hat{A}_j^{-1} = \Phi(A_w^{-1}, A_j),$$

where $A_w^{-1}$ is the matrix inverse estimate of regularized Gram Matrix $A_w$ for an anchor location corresponding to subcarrier w, and $\Phi(\bullet)$ is an update function with various choices. In some embodiments, $A_w^{-1}$ may be provided to precoder 201 (including its matrix approximation block 268 and precoding block 270) by anchor processing section 260, after anchor processing section 260 receives an anchor request from the downlink processing section 240 (e.g., precoder 201).

In some embodiments, the update function $\Phi(\bullet)$ employs Neumann series for approximating the inverse of regularized Gram Matrix $A_j$. In one example, one iteration of Neumann approximation may be used:

$$\Phi(A_w^{-1}, A_j) = (2I - A_w^{-1} A_j) A_w^{-1},$$

where I represents an identity matrix. In another example, the following update function may be used:

$$\Phi(A_w^{-1}, A_j) = A_w^{-1}(3I - A_j A_w^{-1}(3I - A_j A_w^{-1})),$$

where I represents an identity matrix.

In some embodiments, using a transpose of the downlink channel matrix $H_j$ 276 and the approximation of matrix inverse $\hat{A}_j^{-1}$, matrix approximation block 268 may be configured to compute or otherwise determine a precoding matrix $P_j$, where $$P_j = H_j^H \hat{A}_j^{-1}.$$

In some embodiments, matrix approximation block 268 may provide precoding matrix $P_j$ to precoding block 270. Precoding block 270 may receive encoded and modulated information streams vector $s_j$, and perform precoding on $s_j$ to provide a precoded vector $\hat{q}_j$ using precoding matrix $P_j$. The precoded vector $\hat{q}_j$ may be computed as:

$$\hat{q}_j = P_j s_j \text{ or } \hat{q}_j = H_j^H \Phi(A_w^{-1}, A_j) s_j.$$

Figure 2C:
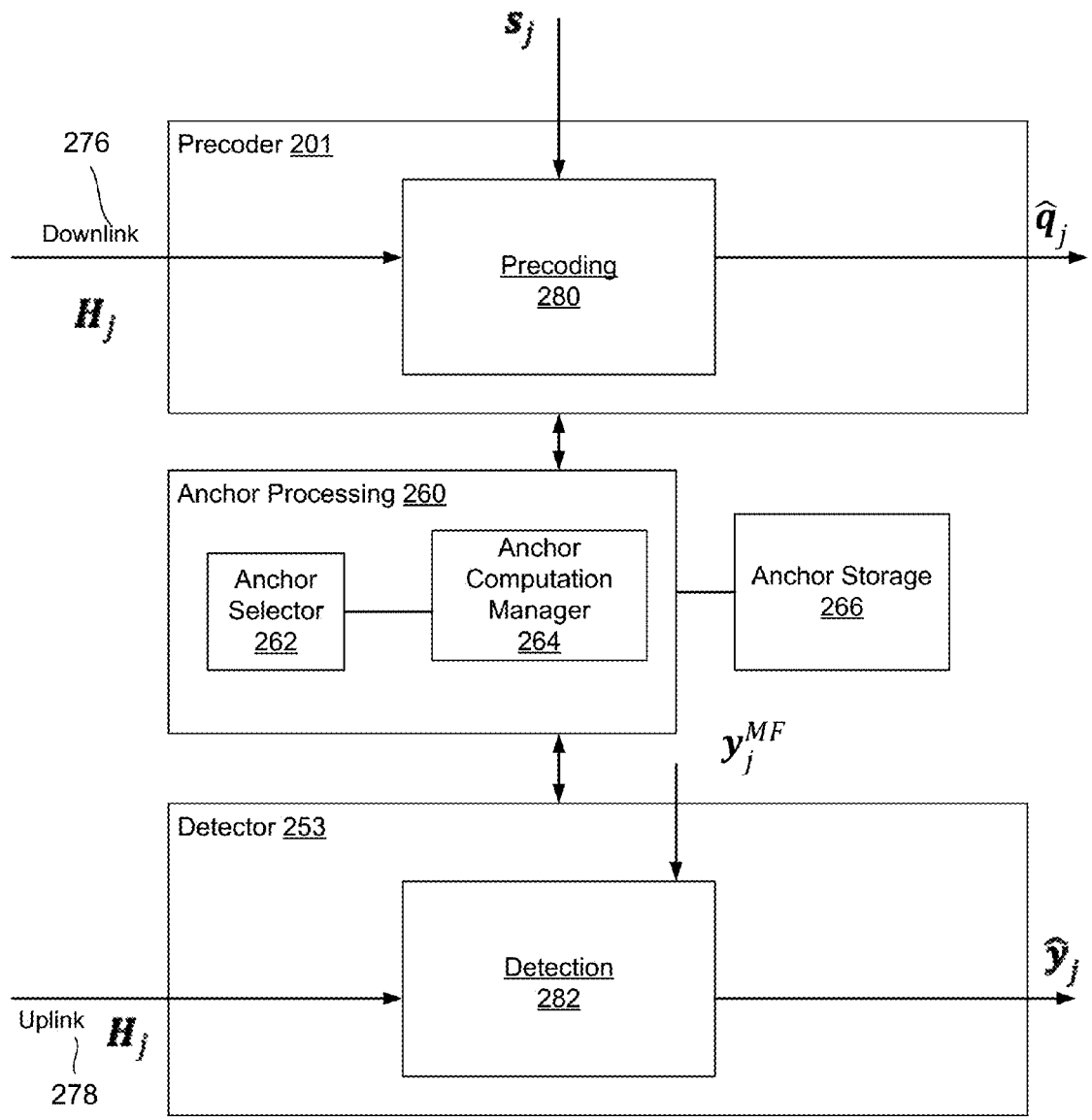
FIG. 2C is a block diagram illustrating the exemplary precoder, anchor processing section, and detector of FIG. 2A according to some embodiments of the present disclosure.

Referring now to FIG. 2C, in some embodiments, computational complexity of the precoding process may be reduced by eliminating the explicit computation of one or more of $G_j$, $A_j$, $\hat{A}_j^{-1}$, and $P_j$. As shown in the example of FIG. 2C, precoding block 280 may receive anchor matrix inverse $A_w^{-1}$ from anchor processing section 260. Precoding block 280 may directly compute precoded vector $\hat{q}_j$, using anchor matrix inverse $A_w^{-1}$ without the explicit computation of one or more of $G_j$, $A_j$, $\hat{A}_j^{-1}$, and $P_j$. In one example, using one iteration of Neumann approximation as the update function, $\hat{q}_j = H_j^H \Phi(A_w^{-1}, A_j) s_j$ can be re-written and computed as follows:

$$\hat{q}_j = 2 H_j^H A_w^{-1} s_j - H_j^H A_w^{-1} (H_j H_j^H A_w^{-1} s_j + \sigma^2 A_w^{-1} s_j),$$

wherein $\sigma^2=0$ for ZF, and for MMSE, $\sigma^2 = N_0 E_s^{-1}$, where $N_0 E_s^{-1}$ represents the noise variance. Thus, computational complexity may be reduced by eliminating explicit multiplication of large matrices (e.g., multiplying $H_j$ and $H_j^H$ for Gram Matrix computation) or explicit matrix inversion (exact or approximate) of a large matrix (e.g., exact or approximate matrix inversion to determine a matrix inverse of regularized Gram Matrix $A_j$). Precoded vector $\hat{q}_j$ may be computed without the explicit computation of one or more of $G_j$, $A_j$, $\hat{A}_j^{-1}$, and/or $P_j$ by using other applicable update functions. Computational complexity of various embodiments with explicit matrix inversion and without explicit matrix inversion associated with subcarrier j will be discussed with additional detail below with reference to FIGS. 7A-7D.

Referring back to FIG. 2A, in some embodiments, precoding block 270 of precoder 201 may provide precoded vector $\hat{q}_j$ to the array of transmit antennas 203 for a downlink transmission of information to users 221.

In some embodiments, precoder 201 may be used for MIMO transmission of base station 220. Precoder 201 and each of its blocks may be implemented in hardware, software, or a combination of hardware and software. For purposes of clarity and not limitation, in some embodiments, precoder 201 may be implemented using various hardware resources, such as for example DSP slices, BRAM, and programmable resources of an FPGA; however, in other embodiments, digital signal processors, microprocessors, multi-core processors, memory, and/or other hardware may be used.

Other details regarding downlink processing section 240 of base station 220, such as for example a serial-to-parallel converter and an Inverse Fast Fourier Transformer as might be found in an OFDM system, among other details, are not described in detail herein for purposes of clarity and not limitation.

In some embodiments, on the uplink side, uplink processing section 250 may use anchor processing section 260 to perform adaptive data detection and reduce computational complexity. As shown in the example of FIG. 2A, uplink processing section 250 is coupled to an array of receive antennas 233 to receive information from users 221. Uplink processing section 250 may include a matched filter 251, a detector 253, and decoding and demodulation blocks 255, namely decoders and demodulators. The detector 253 may perform data detection on a per-subcarrier basis. During an uplink data detection process, for a particular subcarrier carrying data, the detector 253 may send an anchor request to anchor processing section 260, and receive anchor computation results for the particular subcarrier. The detector 253 may use the anchor computation results for data detection associated with the particular subcarrier.

As shown in the example of FIG. 2A, in some embodiments, for a particular subcarrier j, matched filter 251 may be coupled to receive an uplink channel matrix $H_j$ and receive vector $y_j$. Matched filter 251 may provide a matched filter output $y_j^{MF}$, which may be computed as, $$y_j^{MF} = H_j^H y_j,$$

where $y_j$ is the frequency-domain (FD) symbols (also referred to as receive vector) received on subcarrier j from array of receive antennas 233 of base station 220. Matched filter output $y_j^{MF}$ may be provided from matched filter 251 to detector 253. During an uplink process, detector 253 may perform channel equalization and computes equalized FD symbols $\hat{y}_j$ as its outputs 254, which will be described below in additional detail with reference to FIG. 2B. In some embodiments, equalized FD symbols of all subcarriers are then used to compute log-likelihood ratio (LLR) values or soft-outputs. Detector outputs 254 (e.g., equalized FD symbols $\hat{y}_j$) may be provided as inputs to decoding and demodulation blocks 255, namely decoders and demodulators. Decoding and demodulation blocks 255 may respectively output data 218.

Referring now to FIG. 2B, detector 253 may include a matrix approximation block 272 and a detection block 274. For a subcarrier j, matrix approximation block 272 may be coupled to receive uplink channel matrix $H_j$ 278. As discussed above, in some embodiments, channel reciprocity between an uplink channel and a downlink channel may be assumed, namely uplink channel matrix $H_j$ 278 equals the Hermitian transpose (also referred to as conjugate transpose) of the downlink channel matrix $H_j$ 276.

In some embodiments, for a particular subcarrier j, matrix approximation block 272 may compute or otherwise determine a Gram Matrix $G_j$, using the uplink channel matrix $H_j$ 278, where $$G_j = H_j^H H_j.$$

In some embodiments, the matrix approximation block 272 may be used to provide a regularized Gram Matrix $A_j$. The matrix approximation block 272 may be configured to compute or otherwise determine $A_j$ using Gram Matrix $G_j$, where $$A_j = G_j + \sigma^2 I, \text{ or } A_j = H_j^H H_j + \sigma^2 I,$$

where $\sigma^2 = 0$ for ZF detection, and $\sigma^2 = N_0 E_s^{-1}$ for MMSE, where $N_0 E_s^{-1}$ represents the noise variance.

In some embodiments, matrix approximation block 272 may be used to provide a matrix inverse of regularized Gram Matrix $A_j$, denoted by $\hat{A}_j^{-1}$ or $A_j^{-1}$. In some embodiments, matrix approximation block 272 may perform an explicit computation of Gram Matrix $G_j$ (e.g., by multiplying $H_j^H$ and $H_j$) and thereafter determine regularized Gram Matrix $A_j$ using the computed Gram Matrix $G_j$. In one example, matrix approximation block 272 may perform an exact matrix inversion of regularized Gram Matrix $A_j$ to determine $A_j^{-1}$. Alternatively, in another example, matrix approximation block 272 may perform an approximate matrix inversion (e.g., based on a Neumann series expansion) of regularized Gram Matrix $A_j$ to determine $\hat{A}_j^{-1}$.

In some embodiments, matrix approximation block 272 may use anchor processing section 260 to determine $\hat{A}_j^{-1}$. For example, matrix approximation block 272 may perform an approximate matrix inversion to determine $\hat{A}_j^{-1}$ using the following update function, $$\hat{A}_j^{-1} = \Phi(A_w^{-1}, A_j),$$

where $A_w^{-1}$ is the matrix inverse of regularized Gram Matrix $A_w$ of an anchor location including subcarrier w, and $\Phi(\cdot)$ is an update function with various choices. In some embodiments, $A_w^{-1}$ may be provided to detector 253 (including its matrix approximation block 272 and detection block 274) by anchor processing section 260, after anchor processing section 260 receives an anchor request from the uplink processing section 240 (e.g., detector 253).

In some embodiments, the update function employs Neumann series for approximating the inverse of matrix $A_j$. In some embodiments, the update function $\Phi(\cdot)$ employs Neumann series for approximating the inverse of regularized Gram Matrix $A_j$. In one example, one iteration of Neumann approximation may be used:

$$\Phi(A_w^{-1}, A_j) = (2I - A_w^{-1} A_j) A_w^{-1},$$

where I represents an identity matrix. In another example, the following update function may be used:

$$\Phi(A_w^{-1}, A_j) = A_w^{-1} (3I - A_j A_w^{-1} (3I - A_j A_w^{-1})),$$

where I represents an identity matrix.

In some embodiments, matrix approximation block 272 may provide matrix inverse $\hat{A}_j^{-1}$ (e.g., determined by either exact or approximate matrix inversion of $A_j$) to detection block 274. Detection block 274 may be configured to compute or otherwise determine equalized FD symbols $\hat{y}_j$ using $\hat{A}_j^{-1}$ and $y_j^{MF}$:

$$\hat{y}_j = \hat{A}_j^{-1} y_j^{MF} \text{ or } \hat{y}_j = \Phi(A_w^{-1}, A_j) y_j^{MF}.$$

Referring now to FIG. 2C, in some embodiments, complexity of computing equalized FD symbols $\hat{y}_j$ may be reduced by eliminating the explicit computation of one or more of $G_j$, $A_j$, and $\hat{A}_j^{-1}$. In some embodiments, detection block 282 may receive anchor matrix inverse $A_w^{-1}$ from anchor processing section 260, and directly compute equalized FD symbols $\hat{y}_j$ without the explicit computation of all of $G_j$, $A_j$, and $\hat{A}j^{-1}$ by directly computing $\hat{y}_j$ using anchor matrix inverse $A_w^{-1}$. In one example, using one iteration of Neumann approximation as the update function, $\hat{y}_j = \Phi(A_w^{-1}, A_j) y_j^{MF}$ may be rewritten and computed as:

$$\hat{y}_j = 2A_w^{-1} y_j^{MF} - A_w^{-1} y_j^{MF} + \sigma^2 A_w^{-1} y_j^{MF}),$$

wherein $\sigma^2=0$ for ZF, and $\sigma^2 = N_0 E_s^{-1}$ for MMSE, where $N_0 E_s^{-1}$ represents the noise variance. As such, computational complexity may be reduced by eliminating explicit multiplication of large matrices (e.g., multiplying $H_j^H$ and $H_j$ for Gram Matrix computation) or explicit matrix inversion of a large matrix (e.g., exact or approximate matrix inversion of $A_j$). Equalized FD symbols $\hat{y}_j$ may be computed without the explicit computation of all of $G_j$, $A_j$, and $\hat{A}_j^{-1}$ by using other applicable update functions. Computational complexity of various embodiments with explicit matrix inversion associated with subcarrier j and without explicit matrix inversion associated with subcarrier j will be discussed with additional detail below with reference to FIGS. 7A-7D.

Referring back to FIG. 2A, detector 253 may provide equalized FD symbols $\hat{y}_j$ as detector outputs 254 to decoders and demodulators 255, which may respectively output data 218.

In some embodiments, detector 253 with its blocks may be implemented in hardware, software, or a combination of hardware and software. For purposes of clarity and not limitation, in some embodiments, detector 253 may be implemented using various hardware resources, such as for example DSP slices, BRAM, and programmable resources of an FPGA; however, in other embodiments, digital signal processors, microprocessors, multi-core processors, memory, and/or other hardware may be used.

Uplink processing section 250 of base station 220 may include other details known in the art, such as a parallel-to-serial converter and a Fast Fourier Transformer, which are not described in detail herein for purposes of clarity and not limitation.

Figure 3A:
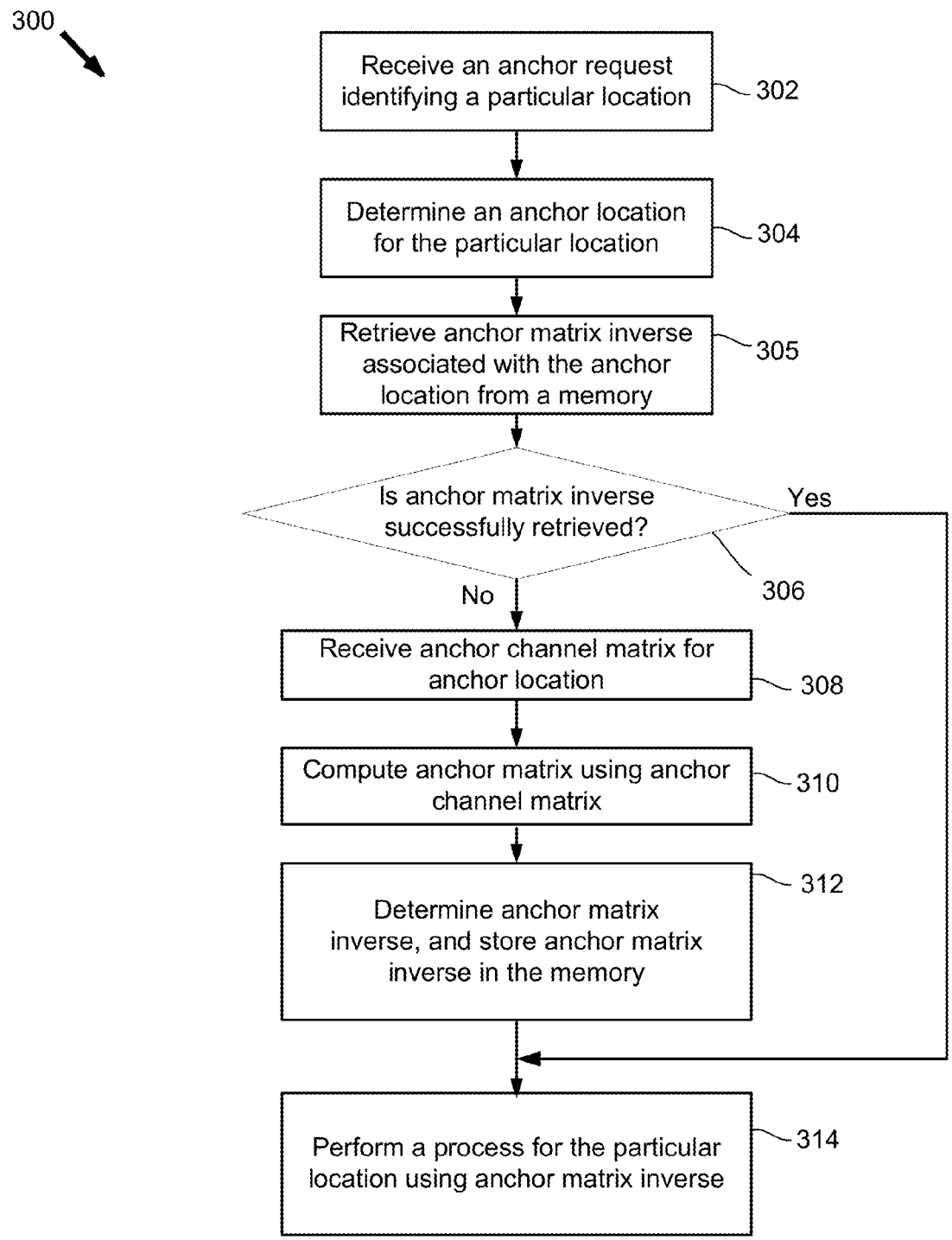
FIGS. 3A and 3B are flow diagrams illustrating methods for using an anchor location in a communication system according to some embodiments of the present disclosure.

Referring now to FIG. 3A, illustrated in FIG. 3A is a flow diagram of one embodiment of a method 300 for performing adaptive data detection and adaptive precoding. The method 300 begins at block 302, where an anchor request identifying a particular location is received. In some embodiments, as shown in the example of FIG. 2B, an anchor request may be sent by one or both of precoder 201 and detector 253, and received by anchor processing section 260. In some embodiments, the anchor request includes a location identifier for identifying the particular location, which may be corresponding to a particular subcarrier and/or a particular symbol. In some embodiments, the location identifier may include a subcarrier identifier. In one example, the subcarrier identifier is a subcarrier index. In another example, the subcarrier identifier is an Orthogonal Frequency-Division Multiple Access (OFDMA) subcarrier index. In some embodiments, the location identifier may include a symbol identifier identifying the particular symbol. In some embodiments, the anchor request includes direction information indicating whether the anchor request is received from and/or requested for an uplink process or a downlink process.

After the anchor request is received, the method 300 proceeds to block 304, where an anchor location for the particular location is determined. Referring back to the examples of FIGS. 2A-2C, in some embodiments, anchor processing section 260 determines the anchor location for the particular location identified by the anchor request. In some embodiments, anchor selector 262 may retrieve the anchor location from anchor storage 266 using the anchor request. In one example, anchor storage 266 may have stored a previously used anchor location for the particular location. Anchor selector 262 may retrieve the previously used anchor location for the particular location and reuse it as the current anchor location. In some embodiments, anchor selector 262 may determine an anchor location according to anchor location configurations (e.g., predefined, and/or generated on-the-fly) and/or spacing parameters (e.g., predefined, and/or generated on-the-fly). In one example, a predefined location may be assigned to serve as the anchor location for all locations located within a predefined region. In some examples, anchor selector 262 may determine the anchor location on-the-fly according to channel conditions. In some embodiments, anchor selector 262 may reuse a previously used anchor location for the particular location until approximation for the particular location using the anchor location becomes inaccurate, and a new anchor location may be determined on-the-fly. The determined anchor location may then be provided to anchor computation manager 264.

After the anchor location is determined, the method 300 proceeds to block 305, where an anchor matrix inverse (e.g., $A_w^{-1}$) associated with the anchor location (e.g., anchor location with subcarrier w) is retrieved. Referring back to FIG. 2B, in some embodiments, anchor computation manager 264 may retrieve from anchor storage 266 an anchor matrix inverse associated with the anchor location. In some embodiments, an anchor matrix inverse associated with the anchor location may be reused between different access link processes (e.g., an uplink data detection process and a downlink precoding process) associated with the same particular location. For example, anchor matrix inverse for the anchor location may have been computed and stored in the anchor storage 266 during a previous access link process (e.g., for the particular location, for the anchor location, and/or for another location within the region covered by the anchor location). During a subsequent access link process for the particular location, anchor computation manager 264 may retrieve the previously stored anchor matrix inverse, and the subsequent access link process for the particular location may use the retrieved anchor matrix inverse to perform required computations. In some embodiments, an anchor matrix inverse for the anchor location may be reused between access link processes (e.g., downlink precoding process or uplink data detection process) associated with different locations within the same region covered by the anchor location.

After performing the retrieval of the anchor matrix inverse, the method 300 proceeds to decision block 306, where it is determined whether the anchor matrix inverse is retrieved successfully. If the anchor matrix inverse is retrieved successfully, the method 300 proceeds to block 314.

At decision block 306, if it is determined that the anchor matrix inverse is not retrieved successfully, the method 300 proceeds to block 308, where an anchor channel matrix for the anchor location (e.g., channel matrix $H_w$ for an anchor location with subcarrier w) is received. Referring to the example of FIG. 2B, anchor computation manager 264 may be coupled to receive an anchor channel matrix (e.g., an uplink anchor channel matrix or a downlink anchor channel matrix) for the anchor location according to the direction information of the anchor request.

After receiving the anchor channel matrix, the method 300 proceeds to block 310, where an anchor matrix is computed. In some embodiments, the anchor matrix may be a regularized Gram Matrix of the anchor location (e.g., $A_w$). In some embodiments, anchor computation manager 264 may be configured to compute or otherwise determine $A_w$, where $$A_w = G_w + \sigma^{-2}I, \text{ or } A_w = H_w^H H_w + \sigma^{-2}I,$$

where I represents an identity matrix, and where $\sigma^2=0$ for ZF detection, and $\sigma^2=N_0 E_s^{-1}$ for MMSE, where $N_0 E_s^{-1}$ represents the noise variance.

After the anchor matrix is computed, the method 300 proceeds to block 312, where an anchor matrix inverse is determined, and the determined anchor matrix inverse is stored in the memory. Referring back to the example of FIG. 2B, in some embodiments, anchor computation manager 264 may perform a matrix inversion (exact or approximation) of the anchor matrix (e.g., $A_w$) to determine an anchor matrix inverse (e.g., $A_w^{-1}$). Anchor computation manager 264 may store the determined anchor matrix inverse in anchor storage 266. In one example, anchor computation manager 264 may compute the anchor matrix inverse by performing an exact matrix inversion of the anchor matrix. In another example, an approximate matrix inversion (e.g., based on a Neumann series expansion) may be used to compute the anchor matrix inverse. In another example, anchor computation manager 264 computes an accurate approximation of anchor matrix inverse (e.g., using a higher order Neumann approximation). After the anchor matrix inverse is determined and stored, the method 300 proceeds to block 314.

At block 314, a process for the particular location is performed using the anchor matrix inverse. In some embodiments, anchor computation manager 264 may provide the anchor matrix inverse to one or both of precoder 201 and detector 253. Referring back to the examples of FIGS. 2A-2C, in some embodiments, an access link process for the particular location is performed. For example, the process is an uplink data detection process (e.g., performed by detector 253 of uplink section 250) or a downlink precoding process (e.g., performed by precoder 201 of downlink processing section 240). In some embodiments, the anchor matrix inverse may be used during a downlink precoding process by precoder 201. For example, the anchor matrix inverse may be used by matrix approximation block 268 for computing matrix inverse for the particular location (e.g., $\hat{A}_j^{-1}$ for a particular location with subcarrier j). For further example, the anchor matrix inverse may be used by precoding block 270 for directly computing a precoded vector for the particular location (e.g., precoded vector $\hat{q}_j$). In some embodiments, the anchor matrix inverse may be used during an uplink data detection process by detector 253. For example, the anchor matrix inverse may be used by matrix approximation block 272 for computing matrix inverse for the particular location (e.g., $\hat{A}_j^{-1}$ for a particular location with subcarrier j). For further example, the anchor matrix inverse may be used by detection block 274 for directly computing equalized FD symbol for the particular location (e.g., equalized FD symbol $\hat{y}_j$).

Figure 3B:
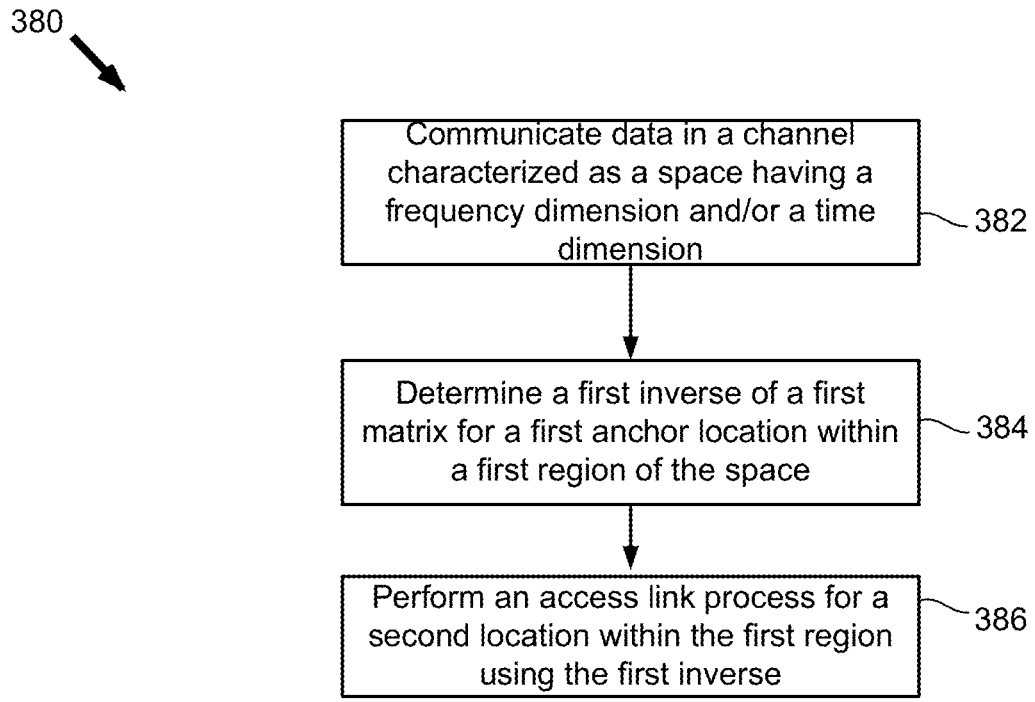

Referring now to FIG. 3B, illustrated in FIG. 3B is a flow diagram of one embodiment of a method 380 for communicating data in communication system 200. The method 380 begins at block 382, where data is communicated in a channel (e.g., communication channel 210) which may be characterized as a space having a frequency dimension and/or a time dimension. The space may have a plurality of anchor locations, and each anchor location corresponds to a respective region of the space.

The method 380 then proceeds to block 384, where a first inverse of a first matrix for a first anchor location within a first region of the space is determined. In some embodiments, the first anchor location corresponds to a particular subcarrier (e.g., subcarrier w). The first matrix (e.g., $A_w$ of subcarrier w) may be a regularized Gram Matrix as discussed above with reference to FIG. 3A. In some embodiments, anchor computation manager 264 may perform an exact matrix inversion or an approximate matrix inversion (e.g., using on a Neumann series expansion) to determine the first inverse (e.g., $A_w^{-1}$).

The method 380 then proceeds to block 386, where an access link process for a second location within the first region is performed using the first inverse. In some embodiments, the access link process may be a downlink precoding process performed by downlink processing section 240. In some embodiments, the first access link process may be an uplink data detection process performed by uplink processing section 250.

Figure 4:
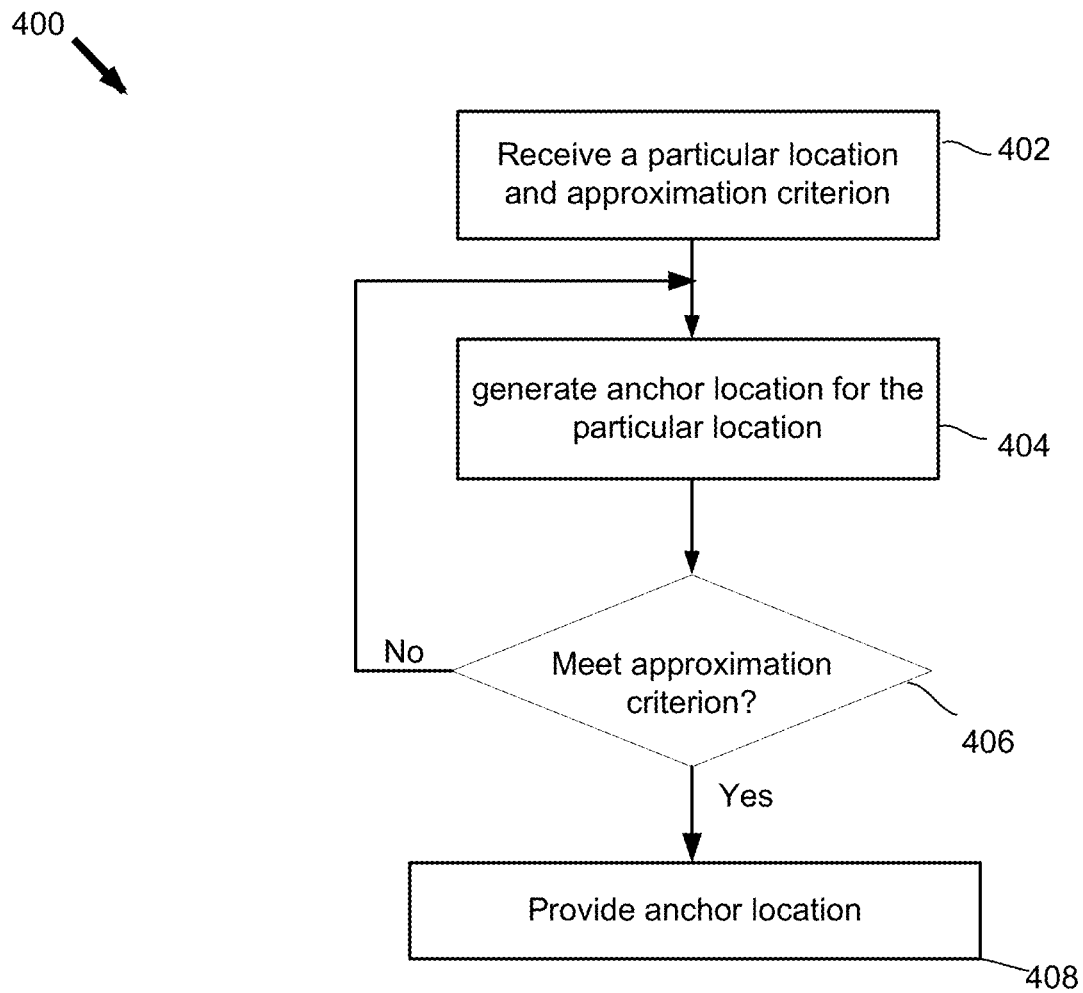
FIG. 4 is a flow diagram illustrating a method for determining an anchor location for an anchor request according to some embodiments of the present disclosure.

Referring now to FIG. 4, illustrated in FIG. 4 is a flow diagram of one embodiment of a method 400 for determining an anchor location for a particular location (e.g., identified by an anchor request). In some embodiments, anchor selector 262 may reuse a previously used anchor location until it is determined that approximation for the particular location using the anchor location may be inaccurate. In some embodiments, anchor selector 262 may determine a new anchor location on-the-fly to improve approximation accuracy and overall performance. As shown in the example of FIG. 4, the method 400 begins at block 402, where a particular location is received. For example, anchor selector 262 may receive the particular location identified by an anchor request and an approximation criterion from downlink processing section 240 or uplink processing section 250. The approximation criterion may be an approximation accuracy requirement for approximating a matrix inverse for the particular location subcarrier using an anchor matrix inverse. In one example, the approximation criterion is that the approximation of matrix inverse for the particular location using the anchor matrix inverse converges. In some embodiments, the approximation criterion is applicable to a particular anchor request. In some embodiments, the received approximation criterion may be applicable to a plurality of anchor requests.

After receiving the particular location and the approximation criterion, the method 400 proceeds to block 404, where an anchor location for the particular location is generated. In some embodiments, anchor selector 262 may generate an anchor location for the particular location according to a fixed assignment, or by using a previously used anchor location as discussed above with reference to block 304 of FIG. 3A. In some embodiments, anchor selector 262 may dynamically generate the anchor location on-the-fly according to channel conditions. In some embodiments, anchor selector 262 may choose an anchor location that has a distance (e.g., in one or both of the time and frequency dimensions) to the particular location that is different from the distance between the previously chosen anchor location for the particular location and the particular location according to channel conditions. In one example, anchor selector 262 may reduce distance when channel conditions change substantially (e.g., when users 211 move a lot). In some embodiments, spacing parameters (e.g., predefined or generated on-the-fly) may be used to determine the respective regions for the anchor locations. In some examples, the same spacing parameters may be used for different anchor locations to determine the respective regions. In some examples, different spacing parameters may be used for different anchor locations to determine the respective regions. In some examples, spacing parameters may depend on the channel conditions.

After generating the anchor location, the method 400 proceeds to decision block 406, where it is determined whether the generated anchor location meets the approximation criterion. In some embodiments, the approximation criterion is that the approximation for matrix inverse of $A_j$ using anchor matrix inverse $A_w^{-1}$ converges, where $A_w^{-1}$ is the anchor matrix inverse for the generated anchor location with subcarrier w, and $A_j$ is the regularized Gram Matrix for the particular location with subcarrier j. In one example, the anchor selector 262 may evaluate the norm of $A_w^{-1}A_j$. If the norm of $A_w^{-1}A_j$ is large, the anchor selector 262 may determine that it implies approximation divergence, thus the generated anchor location does not meet the approximation criterion.

At the decision block 406, if it is determined that the generated anchor location does not meet the approximation criterion, the method 400 may go back to block 404 if a maximum iteration number has not been reached. If it is determined that the generated anchor location meets the approximation criterion, the method 400 proceeds to block 408, where the generated anchor location is provided (e.g., to anchor computation manager 264) for subsequent access link processes.

Figure 5A:
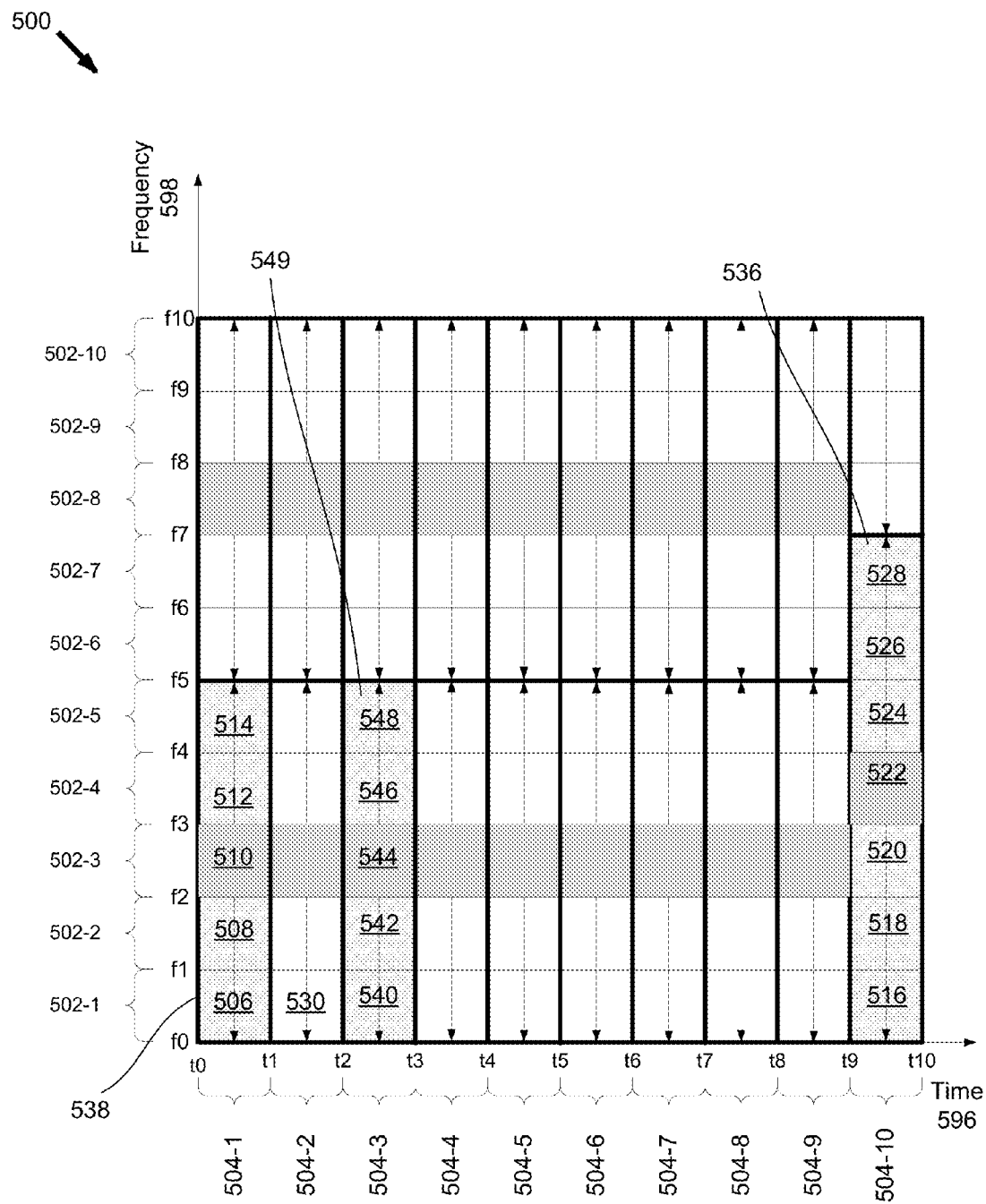
FIGS. 5A-5C are block diagrams illustrating spaces with various anchor location configurations according to some embodiments of the present disclosure.
Figure 5B:
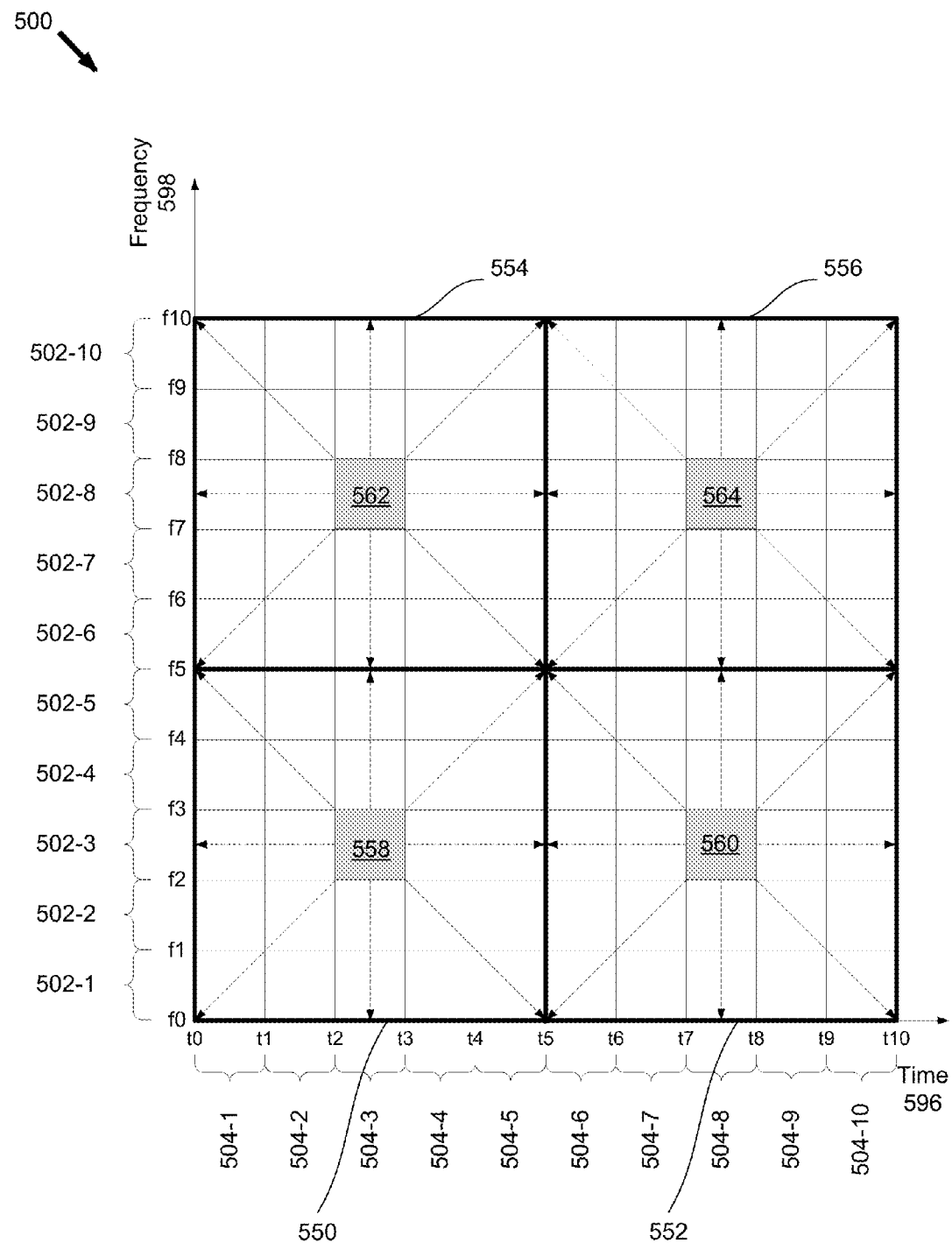
Figure 5C:
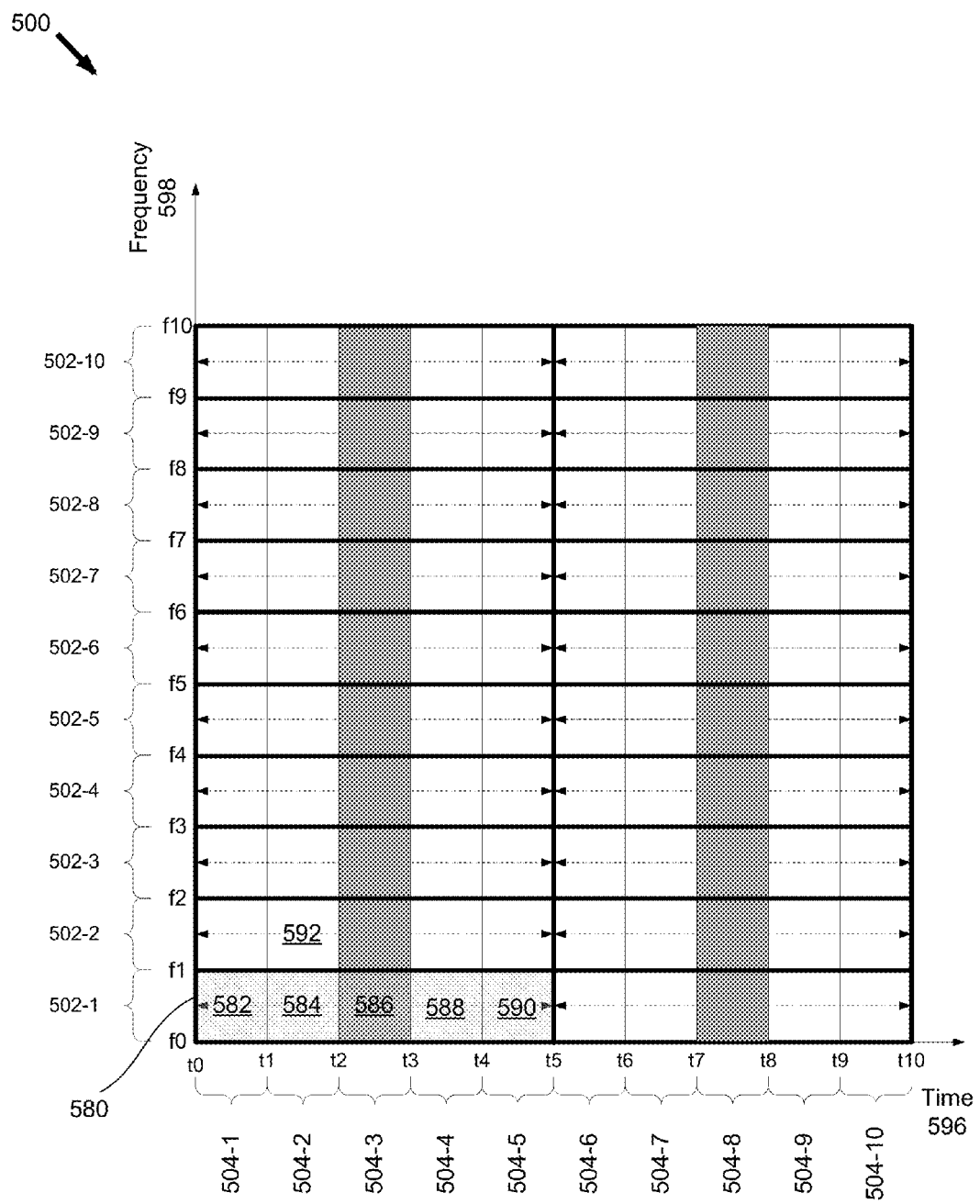
Figure 7A:
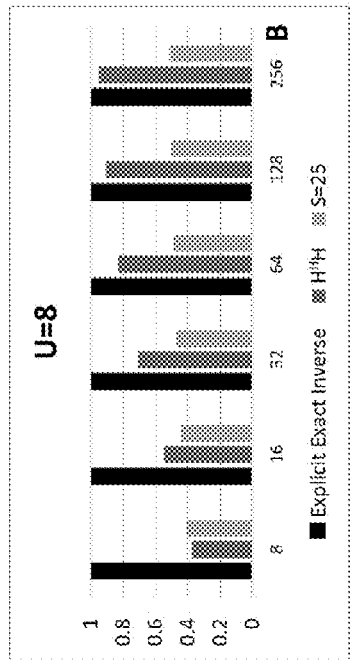
FIGS. 7A-7D illustrate relative operation counts of various embodiments according to the present disclosure.
Figure 7B:
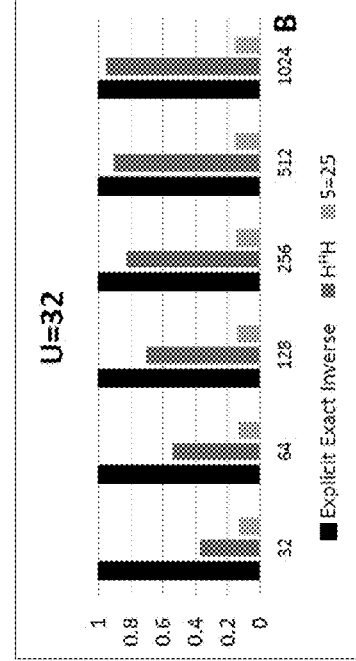
Figure 7C:
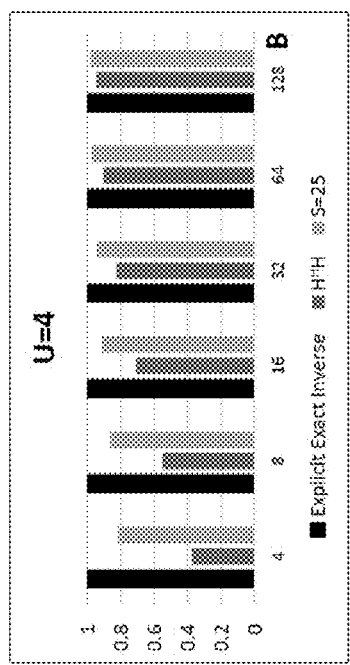
Figure 7D:
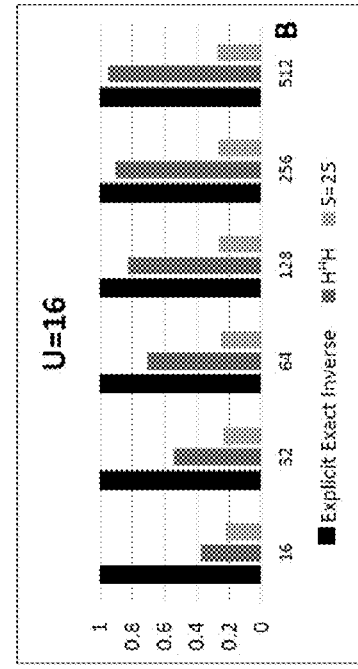

Referring now to FIGS. 5A-5C, embodiments of spaces with various anchor location configurations in a space 500 are illustrated. The anchor location configurations may exploit one or both of frequency domain correlation and time domain correlation. As shown in the examples of FIGS. 5A-5C, a portion of a space 500 that may be used to characterize a communication channel 210 is illustrated. The space 500 may include a time dimension 596 and a frequency dimension 598. In the examples of FIGS. 5A-5C, the horizontal axis corresponds to the time dimension 596, and the vertical axis corresponds to the frequency dimension 598. A location in the space may correspond to a time unit in the time dimension and/or a frequency unit in the frequency dimension. Along the vertical axis, each of subcarriers 502-1 through 502-10 may correspond to a respective frequency unit. For example, subcarrier 502-1 corresponds to a frequency unit extending from frequency f0 to frequency f1. Each of the subcarriers 502-1 through 502-10 may be associated with a corresponding subcarrier identifier (e.g., a subcarrier index), which may indicate its corresponding frequency unit. In some embodiments, the subcarriers 502 may overlap with each other in the frequency dimension. Along the horizontal axis, each of symbols 504-1 through 504-10 may correspond to a respective time unit. For example, symbol 504-1 corresponds to a time unit extending from time t0 to time t1. Each of symbols 504-1 through 504-10 may be associated with a corresponding symbol identifier (e.g., a symbol index), which may indicates its corresponding time unit. A location in the space may also be referred to as a symbol-subcarrier unit, which includes a corresponding symbol and a corresponding subcarrier. For example, symbol-subcarrier unit 506 (also referred to as location 506) includes symbol 504-1 and subcarrier 502-1. For further example, symbol-subcarrier unit 510 (also referred to as location 510) includes symbol 504-1 and subcarrier 502-3. As shown in FIGS. 5A-5C, in some embodiments, communication channel 210 in communication system 200 may be characterized as a space with subcarriers in the frequency dimension, and symbols in the time frequency. In one example, a symbol may span multiple subcarriers (e.g., symbol 504-1 may span over subcarriers 502-1 through 502-10). In some embodiments, data communicated in communication channel 210 through base station 220 may span multiple subcarriers over multiple symbols in the space.

In some embodiments, anchor locations in the space correspond to respective regions in the space. In the example of FIG. 5A, for example, anchor locations 510 and 544 may correspond to region 538 (including locations 506-514) and region 549 (including locations 540-548) respectively. For further example, anchor location 522 may correspond to region 536, which includes locations 516-528. The respective region of an anchor location may be determined according to one or more spacing parameters including frequency spacing parameters and/or time spacing parameters. In some embodiments, a region's widths in the frequency dimension and the time dimension may be determined according to a frequency spacing parameter and a time spacing parameter respectively. For example, region 538 of the anchor location 510 may have a width in the frequency dimension that is determined by a frequency spacing parameter that is equal to five, and have a width in the time dimension that is determined by a time spacing parameter that is equal to one.

In some embodiments, respective regions for different anchor locations may be determined according to the same spacing parameters. For example, region 538 for anchor location 510 and region 549 for anchor location 544 are determined according to a first spacing parameter (e.g. a frequency spacing parameter that equals five). In some embodiments, respective regions for different anchor locations may be determined according to different spacing parameters. In other words, different anchor locations may correspond to respective regions having different sizes. For example, region 536 for anchor location 522 may be determined according to a second spacing parameter (e.g., a frequency spacing parameter that equals seven) that is different from the first spacing parameter.

In some embodiments, frequency domain correlation is exploited. When frequency domain correlation is exploited, the anchor location may be used as an anchor location for a region that includes neighboring locations in the frequency dimension. In other words, the region served by the anchor location may extend to the anchor location's neighboring locations in the frequency dimension. As shown in the example of FIG. 5A, in one example, the symbol-subcarrier unit 510 (also referred to as anchor location 510) may serve as an anchor location for region 538 including neighboring locations 506, 508, 512, and 514 in the frequency dimension. As such, a matrix inverse for anchor location 510 may be used for computation associated with each of locations 506, 508, 512, and 514 located in region 538. In another example, the symbol-subcarrier unit 522 may serve as an anchor location for region 536 including neighboring locations 516-520 and 524-528 in the frequency dimension. As such, a matrix inverse for anchor location 522 may be used for computation for each of the neighboring locations 516-520 and 524-528 in the frequency dimension.

In some embodiments, only the frequency domain is exploited, and the time domain correlation is not exploited. For example, a region for the anchor location may not extend to neighboring time units in the time dimension. The time spacing parameter associated with the anchor location may be equal to one, which indicates that the region only corresponds to the time unit associated with the anchor location. Thus, a location including a particular symbol may not serve as an anchor location for a location that has different symbols. Referring to the example of FIG. 5A, for example, where the time domain correlation is not exploited for anchor location 510, region 538 for anchor location 510 corresponds to only one time unit extending from t0 to t1 in the time dimension. As such, a matrix inverse of location 510 may not be used for computation associated with neighboring locations in the time dimension (e.g., location 530).

Referring now to the example of FIG. 5B, in some embodiments, both frequency domain correlation and time domain correlation may be exploited. In the example of FIG. 5B, four anchor locations 558, 560, 562, and 564 correspond to regions 550, 552, 554, and 556 respectively. Matrix inverse of the anchor locations 558, 560, 562, and 564 may be used for computation for the other locations with the respective regions covered by the anchor locations. Each of the regions 550, 552, 554, and 556 includes twenty-five locations. In other words, in the example of FIG. 5B, a matrix inverse may be explicitly computed every twenty-five locations, where the explicitly computed matrix inverse of an anchor location may be used for computation for twenty-four other locations within the same region. In the example of FIG. 5B, the anchor locations have the same time spacing parameter (e.g., a time spacing parameter that equals five) and the same frequency spacing parameter (e.g., a frequency spacing parameter that equals five).

Referring now to the example of FIG. 5C, in some embodiments, only the time domain correlation is exploited, and the frequency domain correlation is not exploited. For example, a region for the anchor location may not extend to neighboring frequency units in the frequency dimension. The frequency spacing parameter associated with the anchor location may be equal to one, which indicates that the region only corresponds to the frequency unit associated with the anchor location. Thus, a location including a particular subcarrier may not serve as an anchor location for a location that has a subcarrier that is different from the particular subcarrier. Referring to the example of FIG. 5C, for example, location 586 may serve as an anchor location for neighboring locations in the time dimension within region 580 (including locations 582, 584, 588, and 590). As the frequency domain correlation is not exploited for anchor location 586, region 580 for anchor location 586 corresponds to only one frequency unit extending from f0 to f1 in the frequency dimension. As such, a matrix inverse of location 586 may not be used for computation associated with neighboring locations in the frequency dimension (e.g., location 592).

Referring now to the examples of FIGS. 6A-6F, illustrated therein are example simulations showing frame error rate (FER) against signal-to-noise ratio (SNR) for uplink data detection according to various embodiments with different configurations (e.g., receive antenna number of base station denoted by B, user antenna number denoted by U, and/or spacing parameters denoted by s). FIGS. 6A-6F correspond to six communication systems with various base station antenna number and user antenna number configurations (e.g., FIG. 6A corresponds to a communication system with eight base station receive antennas and four user antennas) respectively. In each of FIGS. 6A-6F, three FER curves corresponding to three embodiments that eliminate the explicit computation of both the Gram Matrix and matrix inverse of the regularized Gram Matrix for each of the subcarriers by using anchor locations are illustrated. The three embodiments employ three spacing parameters (e.g., FER curves for "s=25", "s=50", and "s=100"). The value of "s" indicates number of locations in a region covered by each anchor location. Additionally, each of FIGS. 6A-6F illustrates an FER curve for an uplink data detection process using exact matrix inverse for each of the subcarriers (e.g., FER curve for "exact"). As shown in the examples of FIGS. 6A-6F, FER performance of embodiments employing anchor locations may become very close to the FER performance of exact matrix inverse for each of the subcarriers as the base station receive antenna number grows, or as base station antenna number to user antenna number (B/U) ratio grows (e.g., FIG. 6C, FIG. 6F). Furthermore, good FER performance may be achieved in some embodiments employing anchor locations even when B/U ratios are small (e.g., FIGS. 6A-6B). Additionally, as shown in FIGS. 6A-6F, spacing parameters may be configured according to specific performance requirements, B, U, and/or B/U ratios.

Referring now to the examples of FIGS. 7A-7D, illustrated therein are example simulations showing operation counts for uplink data detection processes according to various embodiments with different configurations (e.g., base station receive antenna number denoted by B, user antenna number denoted by U, and/or spacing parameters denoted by s). For example, FIGS. 7A-7D correspond to communication systems with different user antenna numbers respectively (e.g., FIG. 7A corresponds to a communication system with four user antennas). As shown in FIGS. 7A-7D, for each different combination of base station receive antenna number and user antenna number, three relative operation counts corresponding to three embodiments are illustrated respectively. The first relative operation count corresponds to "Explicit Exact Inverse" illustrates the operation count for an embodiment that uses exact matrix inversion of regularized Gram Matrix for each of the subcarriers in the uplink data detection processes. The second relative operation count corresponds to "$H^H H$" illustrates the operation count of explicit Gram Matrix computation, which sets the lower bound of operation counts of embodiments that approximate matrix inverse of regularized Gram Matrix using explicit Gram Matrix computation. The third relative operation count corresponds to "S=25" illustrates the operation count of an embodiment that eliminate the explicit computation of both the Gram Matrix and matrix inverse of the regularized Gram Matrix for each of the subcarriers by using anchor locations. The anchor spacing parameter is twenty-five, and only frequency domain correlation is exploited. As shown in FIGS. 7A-7D, for each of the illustrated base station antenna number and user antenna number combination, the operation count of the embodiment using anchor locations is less than the operation count of the embodiment using exact matrix inversions. Furthermore, as shown in FIGS. 7A-7D, when the user antenna number is equal to or greater than eight, for each of the illustrated base station receive antenna number and user antenna number combination, the operation count of the embodiment using anchor locations is less than the operation count of Gram Matrix computation. Moreover, as shown in FIGS. 7A-7D, the operation counts of the embodiments using anchor locations are not sensitive to the base station receive antenna number, which may result in significant savings as the base station receive antenna number grows large.

It is noted that various configurations (e.g., B, U, anchor locations, spacing parameters) illustrated in FIGS. 5A-7D are exemplary only and not intended to be limiting beyond what is specifically recited in the claims that follow. It will be understood by those skilled in that art that other configurations may be used. Additionally, while the examples of FIGS. 6A-7D are directed at uplink data detection processes, performance and operation count analysis for downlink precoding processes may be substantially similar.

Various advantages may be present in various applications of the present disclosure. No particular advantage is required for all embodiments, and different embodiments may offer different advantages. One of the advantages in some embodiments is that computational complexity is reduced for access link processes using matrix inverses (e.g., the uplink data detection process and downlink precoding process) in a communication system. In one example, instead of explicit matrix inversions at each of all subcarriers, a matrix inverse for an anchor location (e.g., an anchor location associated with a particular subcarrier) is used to facilitate computation required for access link processes for subcarriers within a region covered by the anchor location. In another example, the operation count for computation required for access link processes is reduced. Another advantage in some embodiments is that the computational complexity may be less sensitive to the number of antennas at the base station, which may result in significant savings when the number of antennas at the base station grows large. Yet another advantage in some embodiments is that performance is improved for a communication system with small base station antennas to users ratios. Yet another advantage in some embodiments is that matrix inverses of anchor locations may be saved and reused for access link processes for other locations, which further reduces computational complexity.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A system, comprising
   a memory;
   an integrated circuit coupled to the memory, the integrated circuit is configured to:
   communicate data in a channel characterized as a space having at least a frequency dimension, wherein anchor locations within the space correspond to respective regions of the space;
   determine a first inverse of a first matrix that corresponds to a first channel matrix for a first anchor location of the anchor locations, wherein the first anchor location corresponds to a first region of the regions; and
   perform an access link process for a second location other than the first anchor location but within the first region, the access link process using the first inverse determined for the first anchor location.

2. The system of claim 1, wherein the integrated circuit is configured to perform the access link process for the second location such that the integrated circuit is further configured to:
   estimate a second inverse of a second matrix that corresponds to a second channel matrix for the second location using the first inverse.

3. The system of claim 2, wherein the integrated circuit is configured to perform the access link process for the second location without performing an explicit multiplication of a Hermitian-transposed second channel matrix and the second channel matrix.

4. The system of claim 3, wherein the integrated circuit is configured to perform the access link process for the second location such that the integrated circuit is further configured to:
   receive a receive vector for the second location;
   compute a matched filter output for the second location; and
   compute a data output for the second location using the matched filter output;
   wherein the first anchor location corresponds to a $w^{th}$ frequency unit in the frequency dimension,
   wherein the second location corresponds to a $j^{th}$ frequency unit in the frequency dimension, and
   wherein the data output is expressible as:

$$\hat{y}_j = 2A_w^{-1} y_j^{MF} - A_w^{-1}(H_j^H H_j A_w^{-1} y_j^{MF} + \sigma^2 A_w^{-1} y_j^{MF}),$$

where $H_j$ represents the second channel matrix, $H_j^H$ represents the Hermitian-transposed second channel matrix, $A_w^{-1}$ represents the first inverse for the first anchor location, $\sigma^2$ represents a noise variance, $y_j^{MF}$ represents the matched filter output, and $\hat{y}_j$ represents the data output.

5. The system of claim 1, wherein the space further has a time dimension.

6. The system of claim 5, wherein the first region corresponds to only one time unit in the time dimension.

7. The system of claim 5, wherein the first region corresponds to only one frequency unit in the frequency dimension.

8. The system of claim 1, wherein the first anchor location has a predefined initial value.

9. The system of claim 1, wherein the first anchor location is updated according to channel conditions of the channel.

10. The system of claim 9, wherein the integrated circuit includes a field programmable gate array (FPGA), and wherein the FPGA is configured by a configuration bitstream from the memory.

11. A method, comprising:
   communicating data in a channel characterized as a space having at least a frequency dimension, wherein anchor locations within the space correspond to respective regions of the space;
   determining a first inverse of a first matrix that corresponds to a first channel matrix for a first anchor location of the anchor locations, wherein the first anchor location corresponds to a first region of the regions; and
   performing an access link process for a second location other than the first anchor location but within the first region, the access link process using the first inverse determined for the first anchor location.

12. The method of claim 11, wherein the performing the access link process for the second location further includes:
   estimating a second inverse of a second matrix that corresponds to a second channel matrix for the second location using the first inverse.

13. The method of claim 12, wherein the performing the access link process for the second location does not include performing an explicit multiplication of a Hermitian-transposed second channel matrix and the second channel matrix.

14. The method of claim 13, wherein the performing the access link process for the second location further includes:

receiving a receive vector for the second location;
computing a matched filter output for the second location; and
computing a data output for the second location using the matched filter output;
wherein the first anchor location corresponds to a $w^{th}$ frequency unit in the frequency dimension,
wherein the second location corresponds to a $j^{th}$ frequency unit in the frequency dimension, and
wherein the data output is expressible as:

$$\hat{y}_j = 2A_w^{-1}y_j^{MF} - A_w^{-1}(H_j^H H_j A_w^{-1} y_j^{MF} + \sigma^2 A_w^{-1} y_j^{MF}),$$

where $H_j$ represents the second channel matrix, $H_j^H$ represents the Hermitian-transposed second channel matrix, $A_w^{-1}$ represents the first inverse for the first anchor location, $\sigma^2$ represents a noise variance, $y_j^{MF}$ represents the matched filter output, and $\hat{y}_j$ represents the data output.

15. The method of claim 11, wherein the space further has a time dimension.

16. The method of claim 15, wherein the first region corresponds to only one time unit in the time dimension.

17. The method of claim 15, wherein the first region corresponds to only one frequency unit in the frequency dimension.

18. The method of claim 15, wherein the first region corresponds to multiple time units in the time dimension and multiple frequency units in the frequency dimension.

19. The method of claim 11, wherein the access link process is one of a downlink precoding process and an uplink data detection process.

20. The method of claim 11, where the determining the first inverse of the first matrix that corresponds to the first channel matrix for the first anchor location further includes:

performing an exact inversion of the first matrix or an approximate matrix inversion of the first matrix using a series expansion.

* * * * *